Dec. 6, 1966  K. W. BROMLEY  3,289,252
MACHINE FOR MOLDING BOTTLE CARRYING CASES
Filed March 25, 1964  12 Sheets-Sheet 4
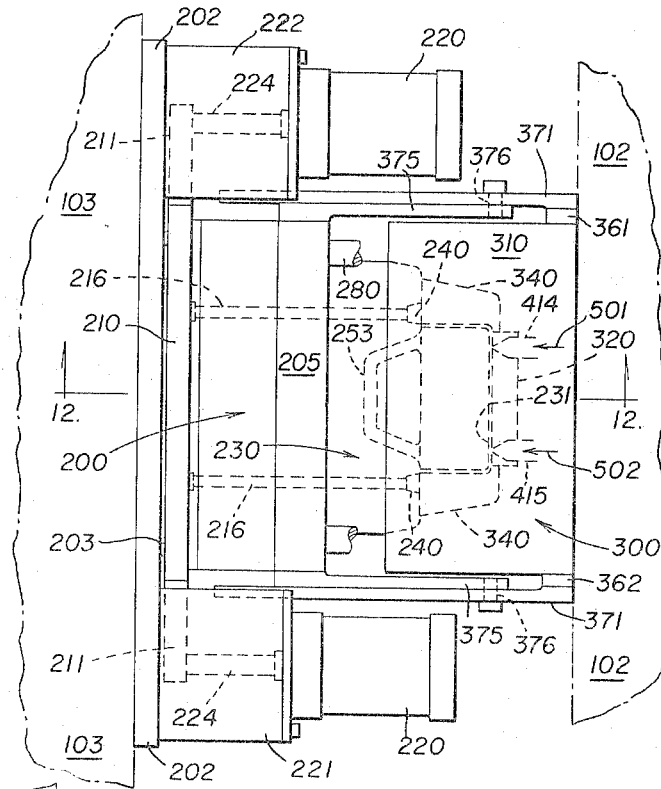
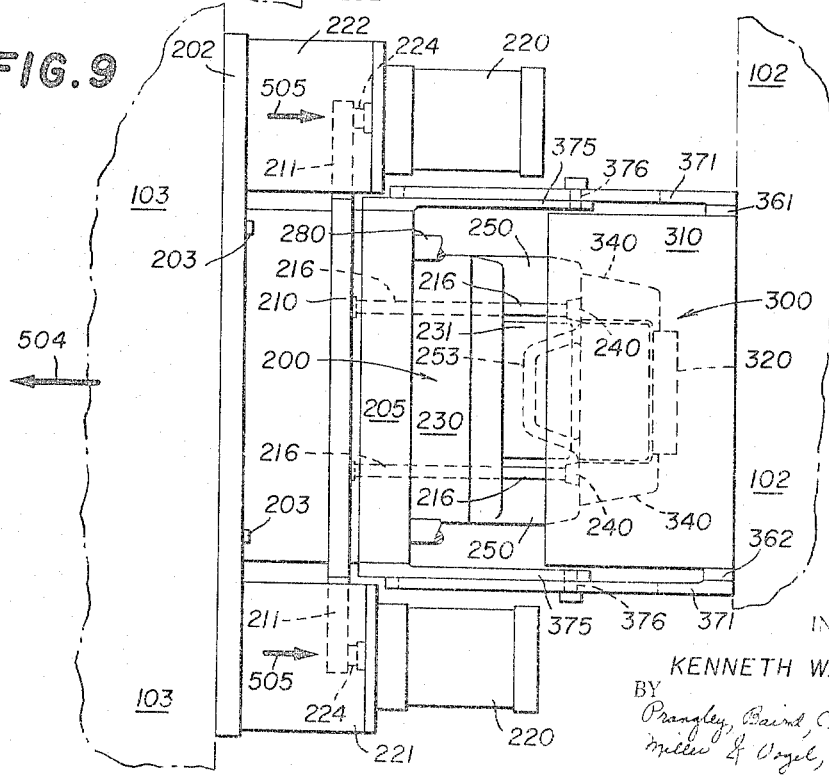
INVENTOR.
KENNETH W. BROMLEY
BY
Prangley, Baird, Clayton,
Miller & Vogel,
ATTYS.

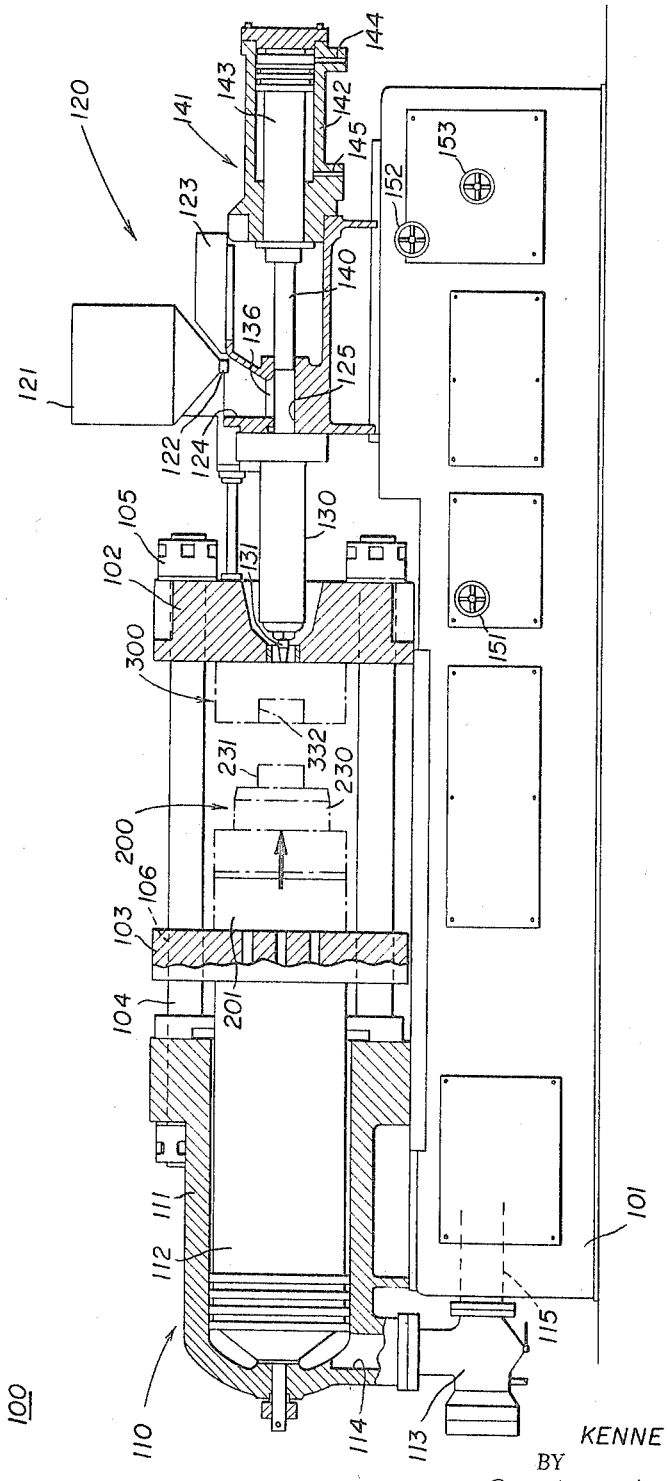

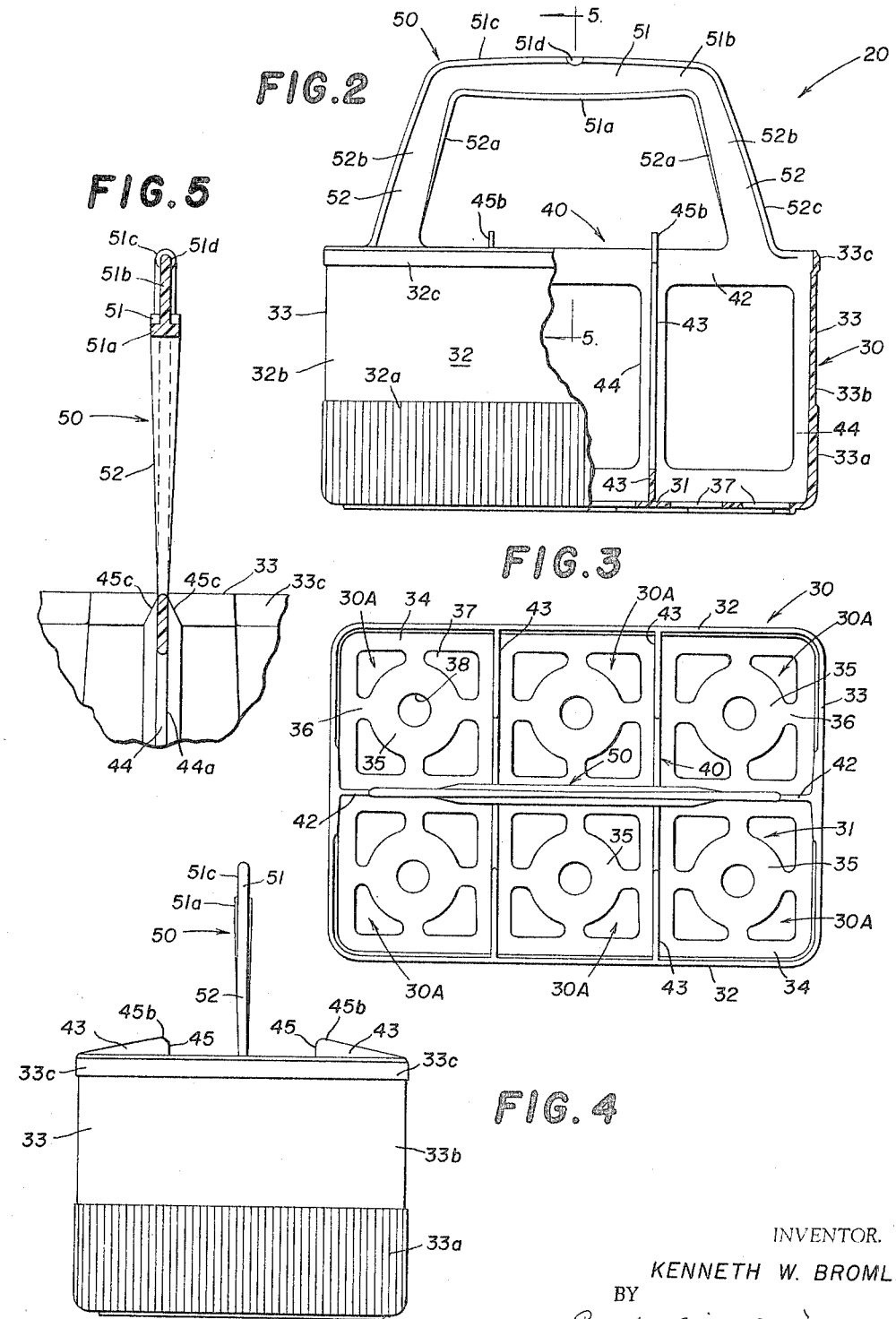

Dec. 6, 1966 K. W. BROMLEY 3,289,252
MACHINE FOR MOLDING BOTTLE CARRYING CASES
Filed March 25, 1964
12 Sheets-Sheet 5
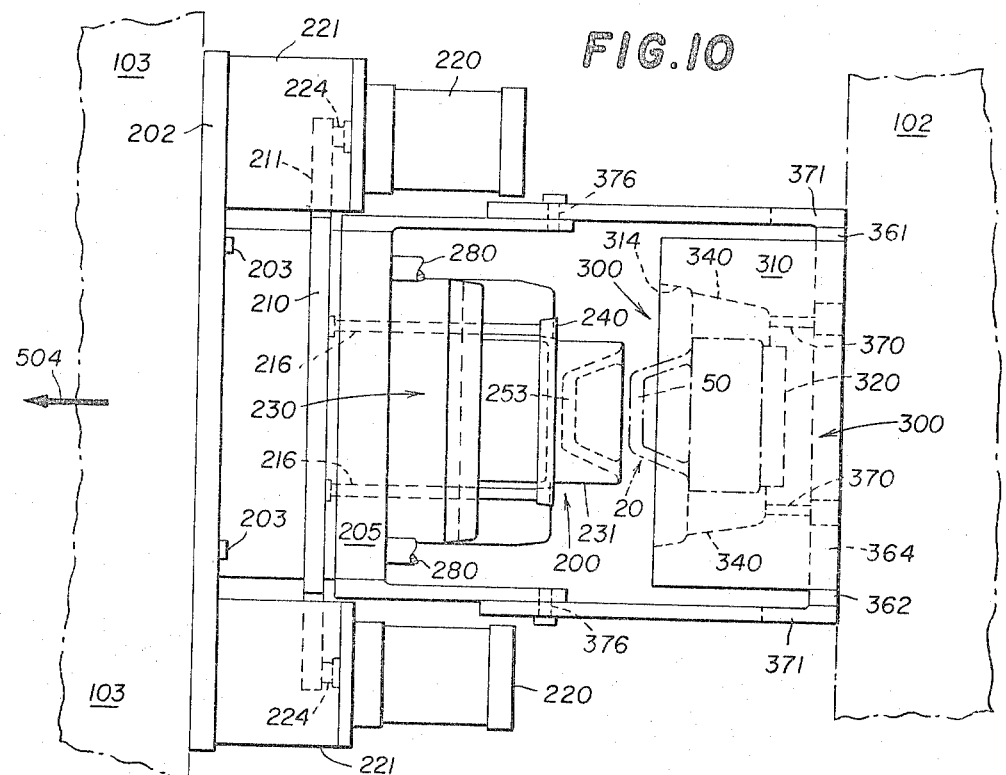
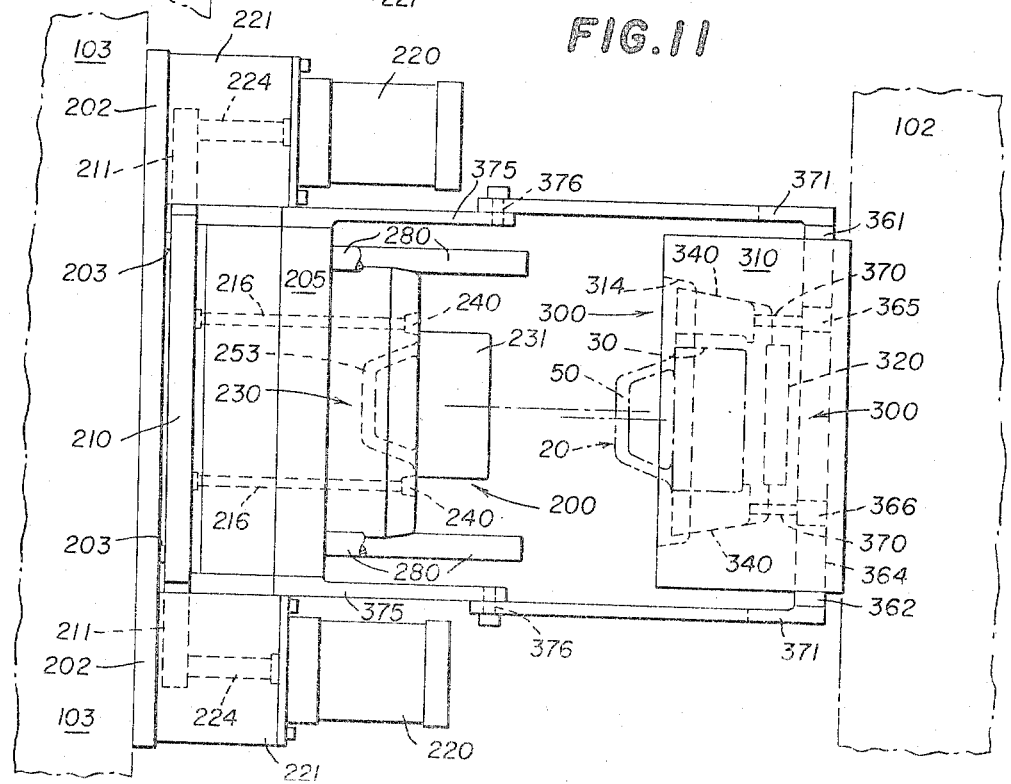

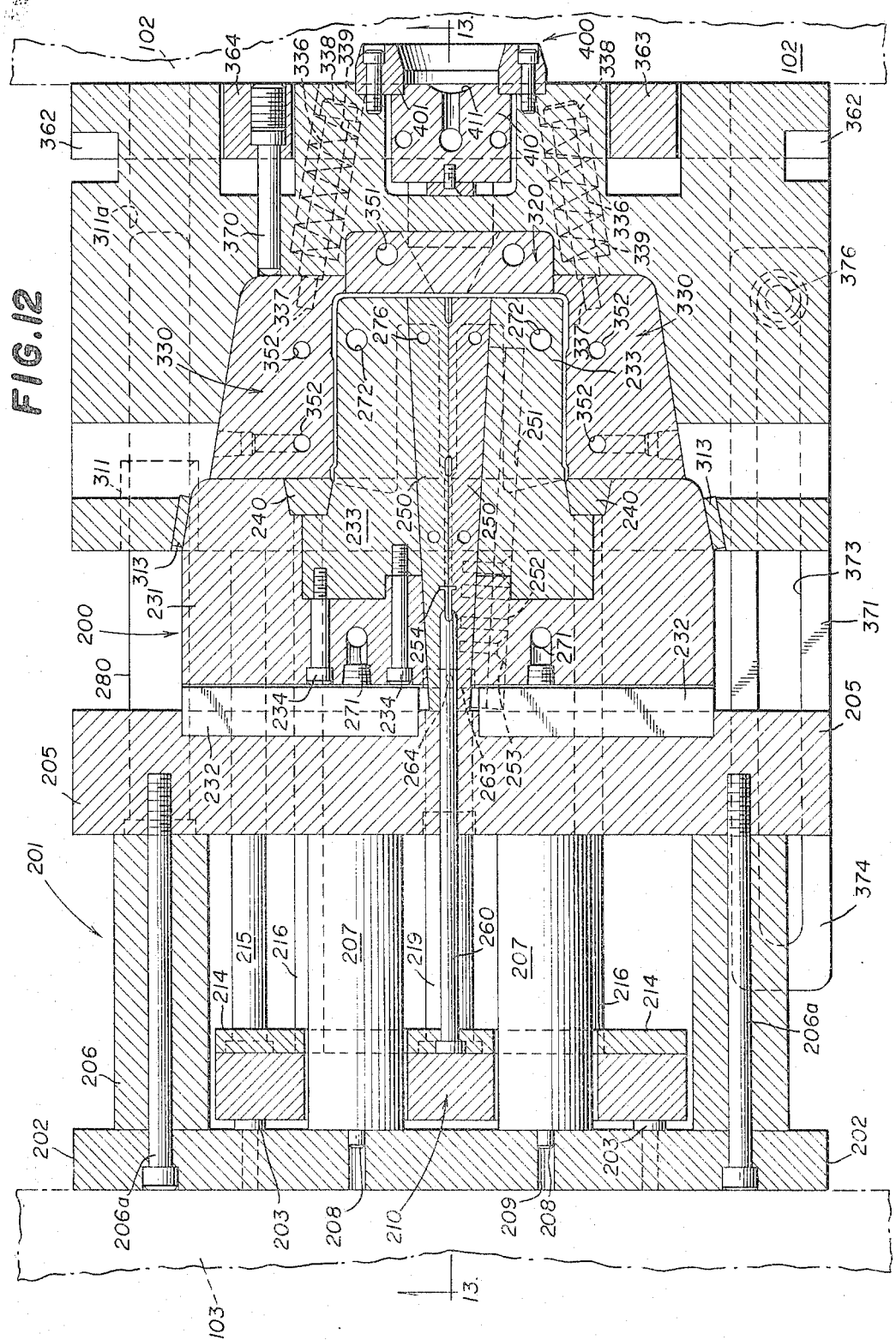

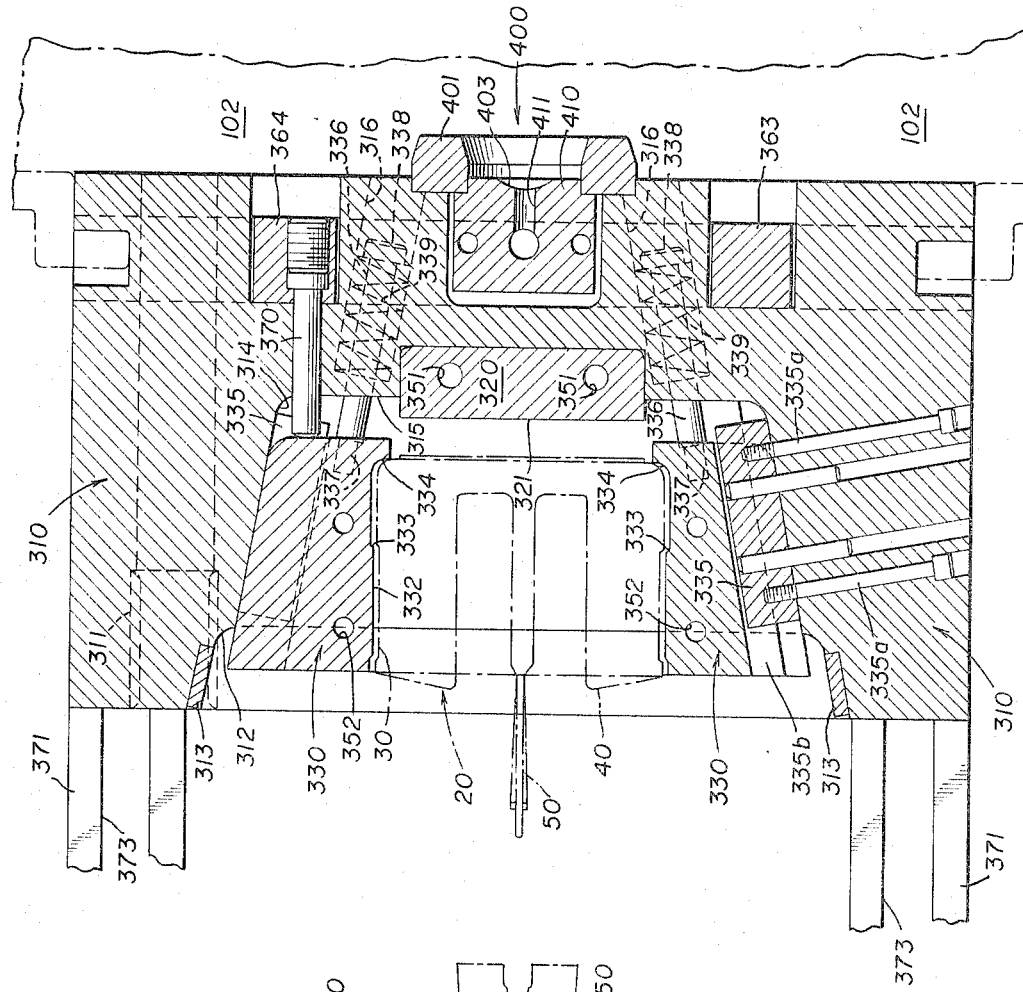
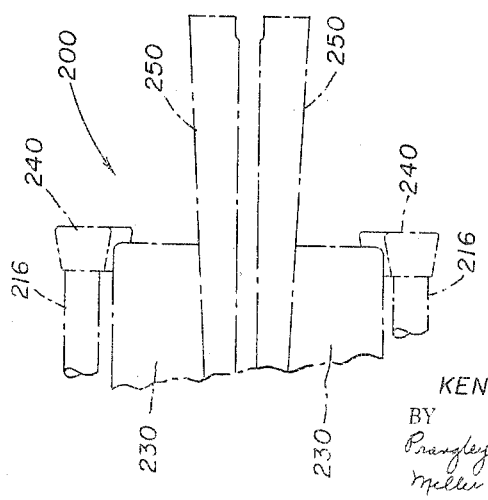
FIG.18
INVENTOR.
KENNETH W. BROMLEY

United States Patent Office 3,289,252
Patented Dec. 6, 1966

3,289,252
MACHINE FOR MOLDING BOTTLE
CARRYING CASES
Kenneth W. Bromley, Hobart, Ind., assignor to General American Transportation Corporation, Chicago, Ill., a corporation of New York
Filed Mar. 25, 1964, Ser. No. 354,653
23 Claims. (Cl. 18—42)

The present invention relates to machines for molding carrying cases for pop bottles, or the like, and particularly such a carrying case that includes a basket-like body having an upstanding handle thereon with lateral projections extending from both sides thereof.

Although the molding machine of the present invention is of general utility, the advantages thereof are more fully realized when applied to the molding of a carrying case of the type disclosed and claimed in my co-pending application for United States Letters Patent, Serial No. 223,443, filed September 13, 1962, for Carrying Cases for Bottles, now Patent No. 3,178,052 granted on April 13, 1965, and accordingly, the present invention will be described as applied to the molding thereof.

In the molding of a carrying case of the character noted a cavity die is provided in which is molded the exterior of the basket-like body and a core die is provided that molds the interior of the basket-like body and the upstanding handle having the lateral projections thereon, the cavity die and the core die in the molding position thereof providing a molding cavity shaped complementary to the carrying case, and thereafter being movable apart to permit the removal of the molded carrying case therefrom. Difficulty is encountered in molding the carrying case when any part thereof, such as the upstanding handle, carries lateral projections extending therefrom in directions substantially normal to the path of travel of the cavity die and the core die from the molding position to the discharging position thereof, since the separation of the dies will tend to break off such projections; difficulty is further encountered when the carrying case to be molded has protuberances on the outer surface of the basket-like body which requires the provision of undercut portions in the cavity die, which protuberances resist removal of the molded carrying case from the cavity die, particularly when the material from which the carrying case is molded is a thermoplastic synthetic organic resin of the rigid type, such for example, as linear high-density polyethylene.

Accordingly, it is an important object of the present invention to provide an improved machine for molding a carrying case for pop bottles, or the like, having an upstanding handle thereon with lateral projections extending from both sides thereof.

Another object of the invention is to provide an improved molding machine for molding a carrying case for pop bottles, or the like, which machine has a core die including a core block and a pair of wedge sections movable with respect thereto and having recesses therein disposed substantially normal to the path of travel of the core die from the molding position to the discharging position thereof and cooperating in the molding position thereof to define that portion of the handle having the lateral projections thereon, the wedge sections being movable laterally with respect to the path of travel of the core die so that the wedge sections clear the lateral projections molded thereby.

Yet another object of the present invention is to provide an improved molding machine of the type set forth, wherein a motor is provided between the core block and the wedge sections for moving the wedge sections with respect to the core block to provide for proper movement therebetween when disengaging the core die from the molded carrying case.

Still another object of the invention is to provide an improved molding machine for molding carrying cases of the type set forth, the machine including an ejector plate carrying an ejector bar which holds the molded carrying case in the cavity die during the withdrawal of the core die including the wedge sections therefrom, the wedge sections being connected to and driven by the ejector plate.

In connection with the foregoing object, another object of the invention is to provide in a molding machine of the type set forth a positioning pin carried by the ejector plate and engaging the molded handle of the carrying case for holding the handle in a generally central position while disengaging the wedge sections therefrom.

Yet another object of the invention is to provide in a molding machine for molding carrying cases of the type set forth an improved cavity die having undercut areas thereon and including a bottom section and a plurality of side sections movable outwardly and away therefrom and from each other to release the molded carrying case therefrom.

In connection with the foregoing, another object of the invention is to provide a multi-section cavity die of the type set forth wherein the cavity sections are resiliently urged to the molding position and are moved toward a carrying case discharging position in response to the final movement of the core die to the discharging position thereof.

Further features of the invention pertain to the particular construction and arrangement of the parts of the molding machine whereby the above-outlined and additional operating features thereof are attained.

The invention, both as to its organization and method of operation together with further objects and advantages thereof, will best be understood by reference to the following specification, taken in connection with the accompanying drawings, in which:

FIGURE 1 is a side elevational view with certain portions in vertical section and other portions broken away of a molding machine made in accordance with and embodying the present invention;

FIG. 2 is a side elevational view, partly broken away, of a carrying case for pop bottles, or the like, which can be advantageously molded using the machine and method of the present invention;

FIG. 3 is a plan view of the carrying case of FIG. 2;

FIG. 4 is an end elevational view of the carrying case of FIG. 2;

FIG. 5 is an enlarged fragmentary vertical sectional view through the handle of the carrying case, this view being taken in the direction of the arrows along the line 5—5 in FIG. 2;

FIG. 8 is a view similar to FIG. 7 and showing the dies in the molding position thereof;

FIG. 9 is a view similar to FIG. 8 and showing the parts in the position after the withdrawal of the core block from the molded carrying case while retaining the wedge sections therein and moving the wedge sections laterally to clear the projections on the handle;

FIG. 10 is a view similar to FIG. 9 and illustrating the core die including the wedge sections thereon completely withdrawn from the molded carrying case and prior to the release of the molded carrying case from the cavity die;

FIG. 11 is a view similar to FIG. 10 and showing the parts in the position immediately after the actuation of the cavity die sections to release the molded carrying case therefrom, and illustrating further the movement of the wedge sections and the ejector ring and the positioning pin to the molding position relative to the core block;

FIG. 12 is an enlarged view in horizontal section through the dies in the molding position thereof and illustrating the constructional details thereof, this view being taken in the direction of the arrows along the line 12—12 in FIG. 8;

Figure 17:
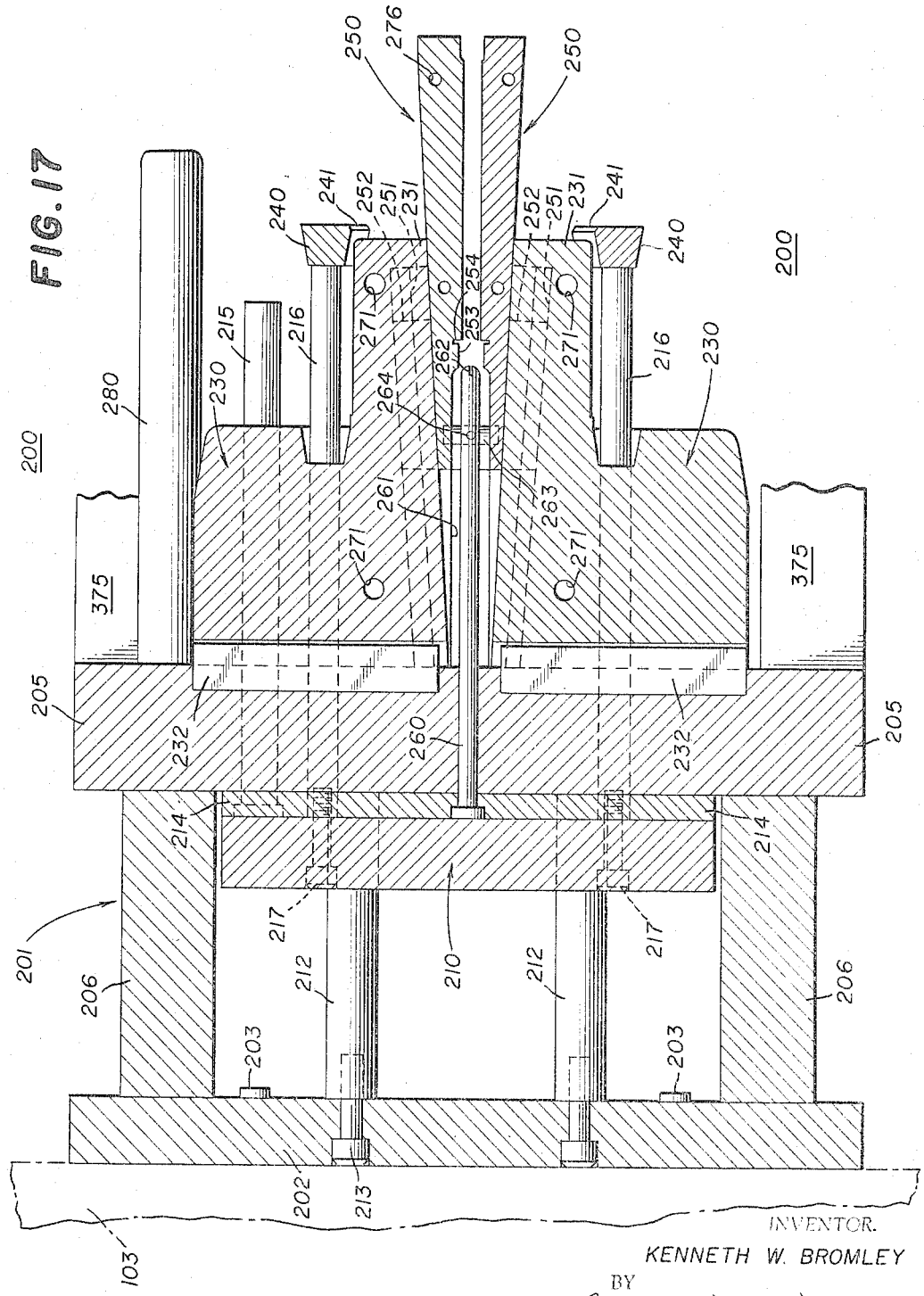

FIG. 17 is an enlarged view in horizontal section showing the details of construction of one end of the core die illustrated in FIG. 12, the ejector plate in FIG. 17 being in the extended position whereby the wedge sections and the ejector bars and the positioning pin are in the extended positions thereof with respect to the core block; and FIG. 18 is a view in horizontal section of the cavity die illustrated in FIG. 12, the cavity die sections in FIG. 18 being shown in the carrying case discharging position thereof, and a portion of the core die being shown in dash-dot lines to illustrate the position with respect thereto when the parts are in the positions illustrated.

Referring now to the drawings and particularly to FIGS. 2 through 5 thereof, there is illustrated a carrying case of the character which the molding machine of the present invention is particularly adapted to form, the carrying case being generally designated by the numeral 20. The carrying case 20 is especially designed to carry six pop bottles, or the like, and may be called a six-pack; which carrying case 20 is of one-piece construction formed entirely of an integrally molded single mass of thermoplastic synthetic organic resin of the rigid type, such for example, as linear high-density polyethylene. Specifically, the case 20 comprises a basket-like body 30, divider structure 40 and handle structure 50.

The body 30 includes a substantially rectangular bottom wall 31 having four rounded corners, a pair of longitudinally extending substantially parallel laterally spaced-apart upstanding side walls 32, and a pair of laterally extending substantially parallel longitudinally spaced-apart upstanding end walls 33, and provided with an open top, the five walls named being joined together along the several junctions therebetween. The body 30 is adapted to receive the six bottles arranged in three longitudinally positioned groups of two laterally positioned individual bottles so that the side walls 32 are correspondingly longer than the end walls 33. The lower portion of each of the side walls 32 comprises a plurality of longitudinally spaced-apart upstanding ribs 32a; and the lower portion of each of the end walls 33 comprises a plurality of laterally spaced-apart upstanding ribs 33a; which ribs 32a and 33a constitute outwardly projecting protuberances and produce a continuous lower band extending around the lower portion of the body 30. The ribs 32a and 33a not only provide an attractive decoration upon the body 30, but they also substantially reinforce the lower portion thereof in a highly desirable manner. The intermediate portion of each of the side walls 32 is disposed slightly laterally inwardly as indicated at 32b, with respect to the upper portion 32c thereof; and the upper portion 32c of each side wall 32 is disposed approximately in the plane of the ribs 32a carried by the lower portion thereof. Similarly, the intermediate portions of each of the end walls 33 is disposed slightly longitudinally inwardly, as indicated at 33b, with respect to the upper portion 33c thereof; and the upper portion 33c of each end 33 is disposed approximately in the plane of the ribs 33a carried by the lower portion thereof. Thus the upper portions 32c and 33c of the respective walls 32 and 33 define, in effect, a continuous upper band extending around the upper portion of the body 30, and the intermediate portions 32b and 33b of the respective walls 32 and 33 define, in effect, a continuous intermediate band extending around the intermediate portion of the body 10.

The divider structure 40 is disposed fundamentally in the body 30 and includes a plurality of upstanding intersecting divider walls arranged to divide the interior of the body 30 into six bottle-receiving pockets 30A having open tops and readily accessible from the exterior. Specifically, the divider structure 40 includes a longitudinally extending upstanding divider wall 42 located substantially centrally between the side walls 32 and substantially parallel thereto, and two laterally extending upstanding divider walls 43 located in substantially parallel and equally longitudinally spaced-apart relation with each other as with the end walls 33. The bottom of the divider wall 42 and the bottoms of the divider walls 43 are joined to the adjacent portions of the bottom wall 31; the opposite ends of the divider wall 42 respectively join the adjacent portions of the opposed end walls 33; the opposite ends of each of the divider walls 43 respectively join the adjacent portions of the opposed side walls 32; and the divider wall 42 joins the two divider walls 43 at the two upstanding intersections therebetween.

The handle structure 50 extends longitudinally of the body 30 and is arranged in upstanding position thereabove and directly over or above the divider wall 42 and is positioned substantially symmetrical with respect to the end walls 33, as clearly shown in FIG. 2. Specifically, the handle structure 50 includes a substantially centrally disposed hand-grasp section 51 spaced well above the top central portion of the divider wall 42 and two leg sections 52, the top portions of the two leg sections 52 being respectively joined to the opposite end portions of the hand-grasp section 51 and the bottom end portions of the two leg sections 52 being respectively joined to the top of the divider wall 42 at two longitudinally spaced-apart positions disposed respectively adjacent to and somewhat longitudinally inwardly of the end walls 33, as clearly shown in FIG. 2.

The six portions of the bottom wall 31 respectively defining the bottoms of the six bottle-receiving pockets 30A are of reticular structure, as clearly shown in FIG. 3. Specifically, each of the six pocket bottoms mentioned includes a substantially square frame 34, a substantially annular centrally positioned base 35 and four interconnecting arms 36, the four arms 36 being disposed in substantially equi-angularly spaced-apart relation about the base 35 and respectively joining the four portions of the base 35 mentioned and the respective four sides of the frame 34. The arrangement of the arms 36 described defines four substantially triangular openings 37 in the pocket bottom and disposed about the base 35 and adjacent to the four junctions between the four sides of the frame 34; and the central portion of the base 35 has a substantially circular opening 38 therein.

The two divider walls 43 divide the divider wall 42 into three longitudinally spaced-apart sections; and similarly, the single divider wall 42 divides each of the two divider walls 43 into two laterally spaced-apart sections.

Three substantially rectangular openings 44 are respectively provided in the three sections of the divider wall 42 and four substantially rectangular slots 45 are respectively provided in the four sections of the two divider walls 43. In each section of each divider wall 43, the upper portion thereof projects upwardly and inwardly from the adjacent side wall as illustrated at 45b in FIG. 4.

In the handle structure 50, the hand-grasp section 51 as a lateral cross section that is of substantially inverted T-shape, so as to present the head 51a of the inverted T, as contrasted with the stem 51b thereof, to the contacting portion of the closed hand of a person grasping the hand-grasp section 51. A reinforcing bead 51c is also provided on the outer edge or at the base of the stem 51b, the bead 51c being interrupted as at 51d as a result of the molding operation, as will be described more fully hereinafter. Similarly, the upper portions of the leg sections 52 have like cross sections, respectively indicated at 52a and 52b and 52c in FIG. 2. These elements 51a and 52a and 51c and 52c on the respective members 51 and 52 materially strengthen the handle 50 and positively prevent accidental injury to a person handling the case 20.

Further details of construction of the carrying case 20 are disclosed in the above-mentioned co-pending application Serial No. 223,443, now Patent No. 3,178,052, to which reference is made for a more full explanation of the construction, advantages and method of use of the carrying case 20. The details of construction of the carrying case 20 which render the molding thereof unusual and difficult are the construction of the handle 50 and the construction of the walls 32 and 33. More specifically, that portion of the handle 50 which is most difficult to mold is the hand-grasp section 51 and particularly the laterally extending portions of the head 51a and the laterally extending portions of the reinforcing bead 51c, and particularly the portions thereof that extend laterally beyond the adjacent surfaces of the stem 51b as illustrated in FIG. 5; the leg sections 52 are likewise difficult to mold because of the lateral projections from the portion 52b that are provided at 52a and 52c. The lateral projections 51a, 51c, 52a and 52c more particularly present problems in removing the die forming these parts therefrom at the conclusion of the molding operation when it is desired to mold the basket-like body 30 and the upstanding handle 50 with the named lateral projections therein as one integral piece.

Problems are also encountered in molding the body 30 and particularly the side walls 32 and 33 thereof wherein the ribs 32a and 33a extend outwardly with respect to the intermediate portions 32b and 33b, and the upper portions 32c and 33c also extend outwardly with respect to the intermediate portions 32b and 33b, whereby to provide undercut portions in the cavity die and particularly to mold the ribs 32a and 33a.

There is shown in FIG. 1 of the drawings a molding machine generally designated by the numeral 100 made in accordance with and embodying the present invention and particularly adapted and designed for molding the carrying case 20 described above, and specifically the handle 50 thereof integral with the body 30 thereof, the handle 50 having the laterally extending projections 51a, 51c, 52a and 52c thereon, and the body 30 having the laterally extending ribs 32a and 33a thereon. The molding machine 100 comprises a base 101 on which is mounted a stationary platen 102 and a movable platen 103, the platen 103 more particularly being mounted upon and moved by a hydraulic motor 110 mounted upon the base 101. The motor 110 includes a cylinder casing 111 fixedly mounted on the base 101 and having therein a cylinder piston 112, the piston 112 being mounted for reciprocating movement substantially horizontally and carrying on the forward or right-hand end thereof as viewed in FIG. 1 the movable platen 103. Four tie bars 104 provided with the usual couplers 105 on the ends thereof interconnect the stationary platen 102 and the cylinder casing 111 and extend through aligned openings 106 in the movable platen 103 to guide the movable platen 103 as it is moved toward the stationary platen 102 and into a molding position and as it is moved away from the stationary platen 102 and to a discharging position, the discharging position being illustrated in FIG. 1 of the drawings. The motor 110 is hydraulically operated and operating fluid therefor is introduced thereinto from a source (not shown) through a control valve 113 and into passages 114 and 115 to control the movement of the cylinder piston 112 and thereby the movement of the movable platen 103 in accordance with a control and timing mechanism (not shown).

When the platens 102 and 103 and the dies mounted thereon are in the molding position thereof, a thermoplastic synthetic organic resin is injected into the molding cavity formed by the dies, the resin being supplied from a resin feed mechanism generally designated by the numeral 120, the feed mechanism 120 injecting a predetermined quantity of resin at the desired holding temperature into the molding cavity so as to provide the material to form a carrying case such as the carrying case 20 described above. The feeding mechanism 120 includes a feed hopper 121 which receives resin in powder or bead form in the upper end thereof and discharges resin at substantially ambient temperature through a discharge nozzle 122 at the bottom thereof, the discharge of the resin from the hopper 121 being in accordance with a feed control designated at 123, the resin being fed through a conical chute 124 into a chamber 125. In order to heat the resin from the ambient temperature at which it enters the chamber 125 to the molding temperature, a heating cylinder 130 is provided, the heating cylinder 130 being provided with electrical connections (not shown) for electrical heaters (not shown) therein which quickly heat the resin from ambient temperature to the molding temperature upon placement therein.

The measured amount of resin within the chamber 125 is moved into the heating cylinder 130 by means of a plunger 140 that is driven by an hydraulic motor 141, the motor 141 including a casing 142 having a cylindrical opening therein receiving a cylinder piston 143, the piston 143 carrying the plunger 140 on the forward or left-hand end thereof as viewed in FIG. 1. Hydraulic connections are made to the casing 142, an input connection 144 being provided to admit fluid under pressure that causes movement of the plunger 140 to the left and an input connection 145 being provided to admit fluid under pressure that causes movement of the plunger 140 to the right, the introduction of hydraulic fluid into the connections 144 and 145 being controlled by control mechanism (not shown) operating in timed relationship with the other parts of the molding machine 100.

The plunger 140 is cylindrical in shape as illustrated and is shaped complementary to the chamber 125 which is also cylindrical in shape and provided with an opening 126 at the upper end thereof communicating with the feed chute 124. When the plunger 140 is moved to the left, the resin within the chamber 125 is pushed into an inlet to the heating cylinder 130 that is in communication with the lefthand end of the chamber 125, it being noted that the plunger 140 is first actuated only approximately one-half of the operable distance thereof, this movement of the plunger 140 being sufficient to transfer the resin to be heated from the chamber 125 into the heating cylinder 130. At a later predetermined time in the molding cycle of the machine 100, the heated resin within the heating cylinder 130 is ejected therefrom by further movement of the plunger 140 to the left as a result of the operation of the hydraulic motor 141, and this further movement of the plunger 140 to the left pushes the now heated and molten resin from the heating cylinder 130 and outwardly through an outlet nozzle 131 at the lefthand end thereof and into the sprue hole in the die set mounted upon the platens 102 and 103, thereby to fill the molding cavity provided by the dies and to form an article such as the carrying case 20.

The molding machine 100 is further provided with the necessary mechanisms for controlling the operation thereof, certain of the controls being illustrated in FIG. 1 and including an inching control 151, a volume control 152 and an injection pressure control 153, it being understood that additional controls (not shown) are provided to produce the required operation of the various components of the molding machine 100.

In the molding of the carrying case 20 of FIGS. 2 to 5 of the drawings, the molding machine 100 is provided with a die set including a core die generally designated by the numeral 200 and mounted upon the movable platen 103 by means of a spacer structure 201, and a cavity die generally designated by the numeral 300 and mounted upon the stationary platen 102, the core die 200 and the cavity die 300 in the closed or molding position thereof forming a molding cavity that is shaped complementary to the carrying case 20 as will be described more fully hereinafter.

Figure 13:
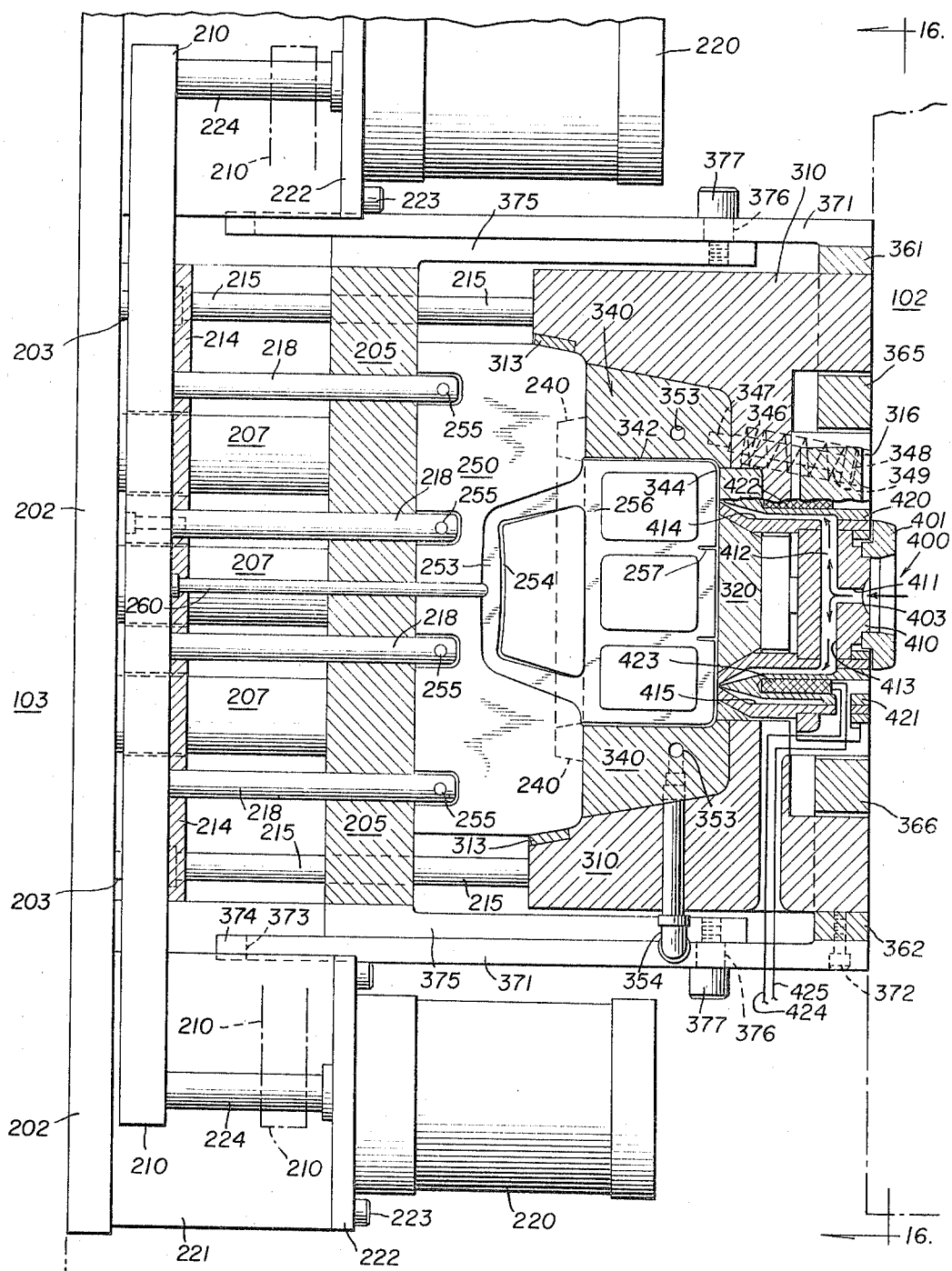
FIG. 13 is a vertical sectional view through the dies of FIG. 12, this view being taken in the direction of the arrows along the line 13—13 in FIG. 12.
Figure 14:
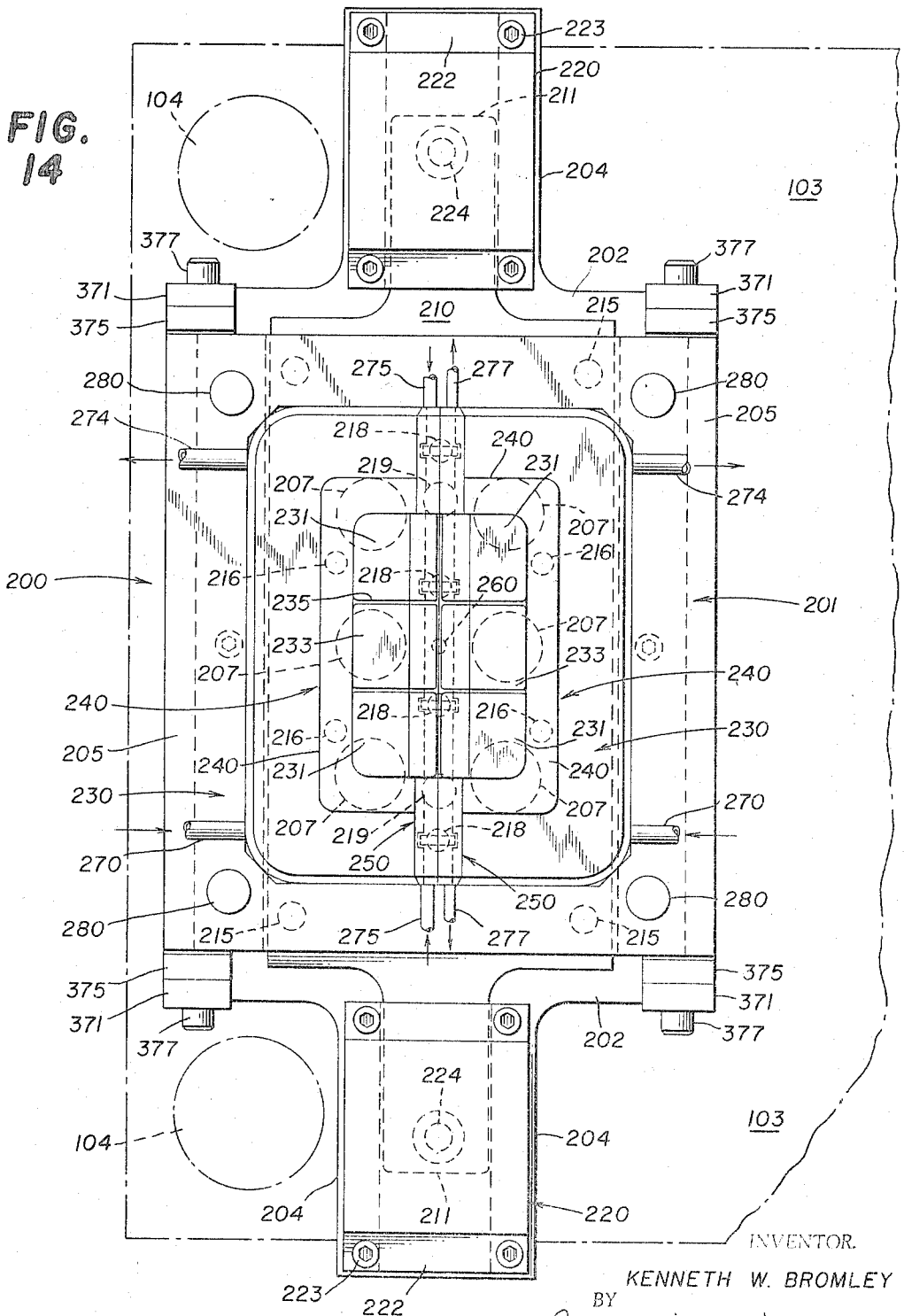
FIG. 14 is a front elevational view with certain portions broken away of the core die forming a part of the molding machine of the present invention, this view being taken in the direction of the arrows along the line 14—14 in FIG. 7.
Figure 15:
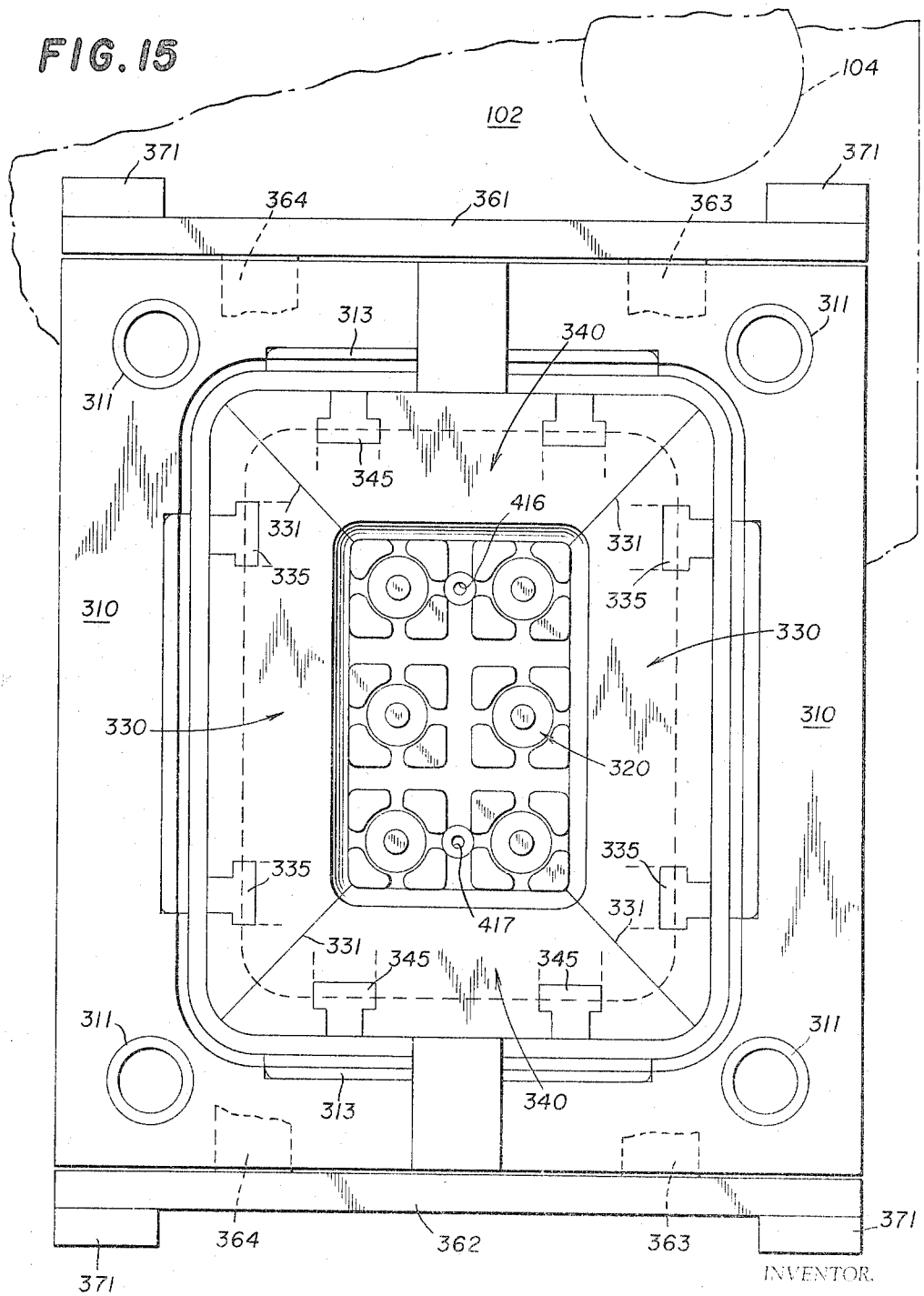
FIG. 15 is a front elevational view with certain portions broken away of the cavity die forming a part of the molding machine of the present invention, this view being taken in the direction of the arrows along the line 15—15 in FIG. 7.

The details of construction of the core die 200 are best illustrated in FIGS. 12, 13, 14 and 17 of the drawings, wherein it will be seen that the core die 200 is mounted upon the spacer structure 201 that in turn is mounted upon the movable platen 103 for movement therewith between a molding position and a discharging position for the core die 200. The spacer structure 201 includes a clamping plate 202 which is generally rectangular in shape with the longer dimension thereof orientated vertically as is best seen in FIG. 14, the clamping plate 202 being fixedly mounted on the movable platen 103 by means of fasteners (not shown) and having a pair of integral ears 204 thereon, one of the ears 204 extending upwardly from the upper edge substantially centrally thereof and the other ear extending downwardly from the lower edge substantially centrally thereof.

Fixedly mounted upon the clamping plate 202 is a core retainer plate 205 which is also generally rectangular in shape and is orientated with the longer dimension thereof vertical as is best seen in FIG. 14, the plate 205 being positioned a predetermined fixed distance from the adjacent surface of the clamping plate 202 by a plurality of outer spacers 206 and by a plurality of inner spacers 207 (six having been illustrated), a plurality of bolts 206a fixedly interconnecting the clamping plate 202 and the retainer plate 205 and extending through the outer spacers 206. The inner spacers 207 are spaced inwardly from the periphery of the retainer plate 205, the rear ends of the inner spacers 207 having projections 208 thereon extending into suitable holes 209 in the clamping plate 202 to maintain the inner spacers 207 in the proper operative position.

Disposed between the clamping plate 202 and the core retainer plate 205 is an ejector plate 210 which is mounted for movement therebetween during the discharging operation, the ejector plate 210 being generally rectangular in shape and having a pair of ears 211 thereon (see FIG. 14), one of the ears 211 extending upwardly from the upper edge of the ejector plate 210 and disposed substantially centrally thereof and the other ear 211 extending downwardly from the lower edge of the ejector plate 210 and disposed substantially centrally thereof. A plurality of holes, for example four, are provided in the ejector plate 210 to receive therethrough guide pins 212 which are held in the operative position by bolts 213 extending through the clamping plate 202, the guide pins 212 extending from the clamping plate 202 to the adjacent side of the retainer plate 205, whereby the pins 212 serve to guide the movement of the ejector plate 210 from the position illustrated in FIG. 12 to that illustrated in FIG. 17. The rearmost position of the ejector plate 210 is determined by a plurality of stop pins 203 disposed in suitable apertures in the clamping plate 202, the rear position of the ejector plate 210 being adjustable by changing the height of the pins 203. Mounted on the front face of the ejector plate 210 is a retainer plate 214 which is generally rectangular in shape and serves to mount certain of the parts carried by the ejector plate 210 thereon. More specifically, a set of guide and spacing pins 215 is mounted upon the retainer plate 214, each pin 215 extending forwardly through aligned openings in the retainer plate 205 and outwardly therefrom and through other die parts as will be explained more fully hereinafter, and abutting against the front face of the cavity die 300 when the dies are in the molding position. Also mounted upon the retainer plate 214 are four ejector rods 216 which have the rear ends thereof connected to the ejector plate 210 and the retainer plate 214 by means of bolts 217, the outer ends of the ejector rods 216 carrying ejector bars as will be explained more fully hereinafter. There further are mounted upon the ejector plate 210 four push rods 218 (see FIG. 13) that extend through aligned openings in the retainer plate 205 for mounting certain portions of the core die 200 as will be explained more fully hereinafter. Two wedge spacer blocks 219 are also provided on the retainer plate 214 for urging the wedge sections into the molding position thereof (see FIG. 14 also).

Means is provided to move the ejector plate 210 between the position illustrated in FIG. 12 and the position illustrated in FIG. 17, and more specifically there has been provided a pair of hydraulic motors in the form of air cylinders 220 (see FIGS. 13 and 14). Each of the air cylinders 200 is mounted upon an associated one of the ears 204 on the clamping plate 202, and more specifically, there is provided for each of the air cylinders 210 a pair of spacer blocks 221 fixedly mounted upon the associated ear 204 and extended outwardly therefrom and carrying on the outer ends therefrom the air cylinder 220, and more particularly the base 222 thereof which is held in position on the spacer blocks 221 by means of a plurality of bolts 223, whereby fixedly to mount each of the air cylinders 220 with respect to the clamping plate 202. Each of the air cylinders 202 has extending therefrom and toward the ejector plate 210 a piston rod 224, the outer ends of the piston rods 224 being fixedly connected to the ejector plate 210 and more specifically to the ears 211 (see particularly FIG. 14), whereby operation of the air cylinders 220 serves to move the ejector plate 210 between the position illustrated in FIG. 13 by the solid lines and that illustrated by dashed lines therein. It will be understood that the ejector plate 210 has suitable cooperating openings therethrough to receive the inner spacers 207 and the guide pins 212 to accommodate such movement thereof.

The core die 200 further comprises a pair of core blocks 230, a pair of ejector bars 240, a pair of wedge sections 250 and a positioning pin 260, all of which cooperate in the molding position of the core die 200 to form the core portion of a cavity shaped complementary to the carrying case 20 to be molded. Each of the core blocks 230 is generally rectangular in shape and includes a pair of forwardly projecting core portions 231 disposed at the top and bottom thereof as viewed in FIG. 14 and each serving to form the corresponding bottle pocket 30A in the carrying case 20, and more particularly the two end pockets 30A in the corresponding row of three pockets. A plurality of keys 232 are disposed in aligned and cooperating pairs of slots in the bottoms of the core blocks 230 and the front of the retainer plate 205 accurately to position the core blocks 230 thereon, the core blocks 230 being slightly spaced-apart to receive the wedge sections 250 therebetween as will be described more fully hereinafter, suitable fasteners (not shown) firmly connecting the core blocks 230 to the retainer plate 205. The center pockets 30A in each row of three pockets is formed by a core insert 233 which is disposed in suitable recesses in the associated core block 230 and are fixedly connected thereto by means of bolts 234 (see FIG. 12); each core block 230 and its associated core insert 233 forms the inner surfaces of the outer walls of the pockets in a row of three pockets 30A, suitable recesses 235 being provided between the core insert 233 and the adjacent core sections 231 that serve to mold portions of the divider walls 43 in the carrying case 20. It will be understood that the outer periphery of the core sections 231 and the core inserts 233 mold portions of the inner surfaces of the side walls 32 and the end walls 33 of the carrying case 20 as well as portions of the inner surface of the bottom wall 31 thereof.

The ejector bars 240 are each formed substantially C-shape in plan view as seen in FIG. 14 and essentially trapezoidal in cross section as seen in FIG. 12 and are received in complementarily shaped recesses in the forward faces of the core blocks 230 and the core inserts 233, the facing ends of the ejector bars 240 being spaced-apart to receive the wedge sections 250 therebetween. The inner edges of the ejector bars 240 are recessed or cut away as at 241 to provide an area for accommodating the molding therein of the upper portion 32c of the side walls 32 and the upper portion 33c of the end walls 33, whereby the ejector bars 240 are in engagement with the upper surface of the body 30 of the carrying case 20 at the conclusion of the molding thereof. Each of the ejector bars 240 is mounted upon the forward ends of a pair of the ejector rods 216, whereby the ejector bars 240 can be moved between the position illustrated in FIG. 12 and that illustrated in FIG. 17 upon the movement of the ejector plate 210 by means of the air cylinders 220.

Each of the core blocks 230 has one of the wedge sections 250 mounted thereon, the wedge sections 250 being identical in shape and extending the length of the core blocks 230 (see FIG. 14) and slidable outwardly therealong. More specifically, each of the core blocks 230 has a pair of T-shaped guide slots 251 therein disposed toward the associated wedge section 250 and receiving therein complementarily shaped guide members 252 that are fixedly attached to the rear portions of the wedge sections 250 such as by the screws 253. The surfaces of the core blocks 230 and the associated core inserts 233 disposed toward each other diverge outwardly and away from each other forwardly or to the right as illustrated in FIGS. 12 and 17, and the contacting surfaces of the wedge sections 250 are similarly shaped; the opposed sets of guide slots 251 diverge from each other at a like inclination, whereby as the wedge sections 250 are moved with respect to the associated core blocks 230 and core inserts 233 from the position illustrated in FIG. 12 to that illustrated in FIG. 17, the wedge sections 250 also moved outwardly and away from each other. Each of the wedge sections 250 includes a recess 253 therein which in combination with the other recess 253 in the associated wedge section 250 forms a cavity to mold the stem 51b of the handle 50 and the recess 254 for molding the head 51a of the handle 50, it being pointed out that the recess 254 is disposed substantially normal to the direction of movement of the core die 200 when moving from the molding position thereof to the discharging position thereof, whereby it is necessary that the wedge section 250 be moved away from each other to the position illustrated in FIG. 17 before the molded handle 50 can be withdrawn therebetween.

The movement of the wedge sections 250 with respect to the core blocks 230 is under the control of the ejector plate 210 and more particularly the four push rods 218, each of which carries on the forward end thereof a cross pin 255 which has the outer ends thereof slidably mounted in complementarily shaped aligned openings in the wedge sections 250 so that the cross pins 255 can provide an interconnection between the associated push rod 218 and the pair of wedge sections 250 to cause movement thereof outwardly with respect to the core blocks 230 while simultaneously accommodating lateral movement of the wedge sections 250 away from each other. The retracted or seated position of the wedge sections 250 is determined by the spacer blocks 219 forming a part of the spacer structure 201 and the forward position of the wedge sections 250 is determined by the forward position of the ejector plate 210. Referring to FIG. 13 of the drawings it will be seen that the wedge sections 250 further have recesses therein for molding other structure forming a part of the divider 40 including the recess 256 and recesses 257 for forming the divider wall 43 therein.

The positioning pin 260 has the rear end thereof mounted upon the ejector plate 210 for movement therewith and extends forwardly through the retainer plate 205 and through opposed grooves 261 in the rear portions of the wedge sections 250 and substantially midway of the length thereof and terminating with the upper end thereof adjacent to the recess 253. The forward end of the positioning pin 260 is rounded and has a longitudinal slot 262 therein in which is molded the portion 51d of the handgrasp section 51 between the interrupted portions of the bead 51c. Disposed rearwardly of the forward end of the positioning pin 260 is a cross pin 263 pivotally connected thereto as at 264 and extending into complementarily shaped recesses in the adjacent faces of the wedge sections 250, so that the pin 263 serves to hold the outer end of the positioning pin 260 at a predetermined attitude with respect to the wedge sections 250 even during the movement of the wedge sections 250 outwardly with respect to each other and to the position illustrated in FIG. 17.

In order to provide for proper operation of the core die 200 during the molding of the carrying case 20, it is necessary that the core die 200 be cooled and to this end suitable connections are made to fluid passages provided in the core blocks 230, the core inserts 233 and the wedge sections 250. More particularly, an inlet connection 270 for a cooling fluid, such as water, is provided for each of the core blocks 230 which connect with cooling passages 271 in the core blocks 230 and the cooling passages 272 in the core inserts 233, the water being removed from the core blocks 230 and the core inserts 233 through discharge pipes 274. A pair of water inlet connections 275 is also provided for the wedge sections 250 that connect with cooling passages 276 therein and which in turn are connected to water outlet connections 277 therefor. The water connections thus described provide for circulation of cooling water so that the core 200 and the molten resin placed in contact therewith can be cooled relatively rapidly to a temperature such that the plastic resin has solidified sufficiently to permit the core die 200 to be removed therefrom.

The construction of the cavity die 300 is best illustrated in FIGS. 13, 15, 16 and 18 of the drawings, wherein it will be seen that the cavity die 300 comprises a cavity block 310, a bottom section 320, a pair of side sections 330 and a pair of end sections 340. The core block 310 is fixedly mounted upon the stationary platen 102 by suitable fasteners (not shown) and has disposed in the four corners thereof bushings 311 mounted in openings 311a for receiving therein guide pins 280 that are fixedly mounted upon the core die 200, and specifically upon the retainer plate 205 thereof, four of the guide pins 280 and four of the bushings 311 being provided, the insertion of the guide pins 280 into the bushings 311 assisting in aligning the core die 200 and the cavity die 300 as the dies are moved to the molding position thereof. There is formed in the face of the cavity block 310 a substantially rectangular recess 312 having mounted at points along the periphery thereof bearing plates 313 which engage the wedge sections 250 and other portions of the core die 200 when the dies are in the closed or molding position. A further recess 314 is provided in the cavity block 310 having the walls thereof converging inwardly and rearwardly and emerging in a bottom wall 315 which has a rectangular recess therein that receives the rectangular cavity bottom section 320. As may be best seen in FIG. 15, the front face 321 of the bottom section 320 is shaped to form the outer surface of the bottom wall 31 of the carrying case 20 in cooperation with the core die 200 when the core die 200 is spaced a short distance therefrom in the molding position thereof.

Mounted in the recess 314 are the cavity side sections 330 and the cavity end sections 340, the side sections 330 and the end sections 340 substantially filling the recess 314 around the periphery of the bottom section 320 and having the adjacent edges thereof joined along lines 331 extending from corners of the bottom section 320.

Each of the side sections 330 has a molding surface 332 thereon including an undercut surface 333 resulting from recesses therein necessary to mold the outstanding protuberances or ribs 32a of the carrying case 20. There further is provided at the bottom of the side section 330 an interned surface 334 which molds a portion of the bottom 31 of the carrying case 20. Each of the side sections 330 is mounted for sliding movement upon the cavity block 310 and to this end each of the sides of the recess 314 has a pair of guides 35 thereon that are substantially T-shaped in cross section and fit in complementarily shaped grooves in the adjacent wall of the associated side section 330. The guides 335 accommodate movement of the side sections 330 from a position wherein the side sections 330 are disposed against the recess bottom 315 as illustrated in FIG. 12 and an ejecting position illustrated in FIG. 18. Structure is provided to bias the side sections 330 toward the molding position of FIG. 12 and more specifically, the core block 310 has a series of four obliquely oriented bores 316 therein in each of which is disposed a rod 336 which has a forward end 337 thereof fixedly connected to the associated side section 330 and has on the other end thereof an enlarged head 338, a spring 339 under compression being provided between the head 338 and the bottom of the bore 316 to urge the rod 336 to the right as viewed in FIG. 18 thus to move the associated side section 330 toward the molding position thereof. Each of the side sections 330 is provided with a pair of the rods 336 (see FIG. 16).

Each of the end sections 340 has a molding surface 342 thereon which is shaped to mold the outer surface of the associated end 33 of the carrying case 20 and includes an inturned surface 344 which molds a portion of the bottom wall 31. Each of the end sections 340 is mounted like the side sections 330 and more particularly there is provided for each of the end sections 340 in the cavity block 310 a pair of guides 345 that are T-shaped in cross section and engage in complementarily shaped slots in the walls of the end sections 340, the guides 345 and the associated slots diverging forwardly and outwardly so that upon movement the end sections 340 outwardly to the left with respect to the block 310 as viewed in FIG. 13, the end sections 340 will also move away from each other as will be explained more fully hereinafter. Biasing structure is provided to urge the end sections 340 to the molding position thereof illustrated in FIG. 13 and more specifically there is provided for each of the end sections 340 one of the obliquely inclined bores 316 in the cavity 310, a rod 346 being provided in each of the associated oblique bores 316 and having at one end thereof a connecting member 347 extending into and connecting with the associated end section 340 and having on the other end thereof an enlarged head 348, a spring 340 under compression being disposed between the underside of the head 338 and the bottom of the bore 316, whereby the associated end section 340 is continually urged to the molding position thereof.

Means is provided for cooling the cavity die 300, and more specifically suitable connections are made thereto for circulating a cooling medium, such as water, through the various parts thereof during the molding operation. To this end the bottom section 320 is provided with passages 351 for water therethrough, the passages 351 being connected to water inlet and outlet pipes (not shown); the side sections 330 are provided with passages 352 therethrough for cooling water, the passages 352 being connected to suitable inlet and outlet pipes (not shown); and the end sections 340 are provided with cooling passages 353 therethrough which are connected to a water inlet pipe 354 and a water outlet pipe (not shown). The various water passages and connections described serve to cool the components of the cavity die 300 so that the resin injected thereinto in a molten condition can be cooled and solidified sufficiently to permit removal of the molded carrying case 20 from the cavity die 300 a reasonable time after the molding of the carrying case 20.

Figure 16:
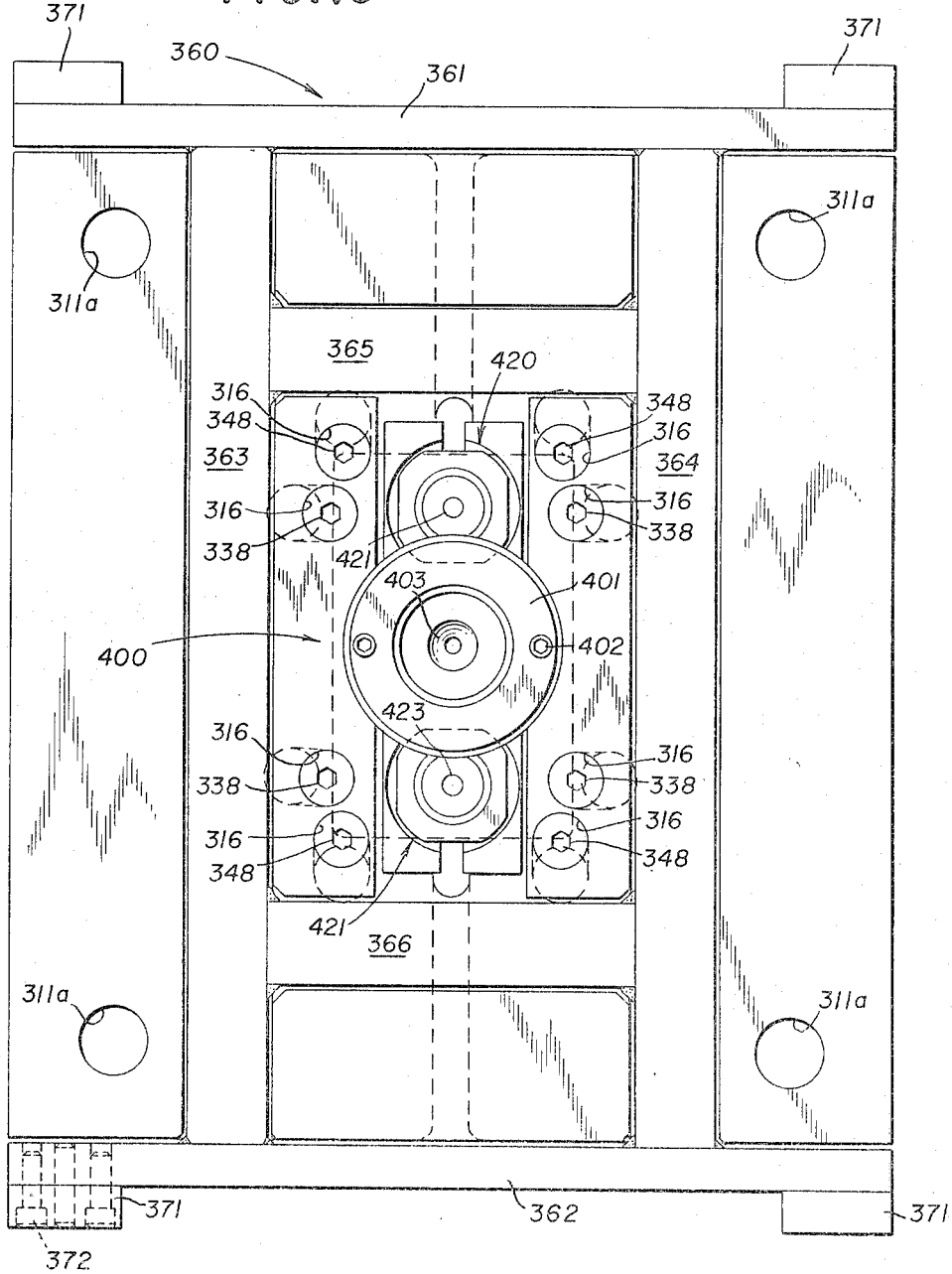
FIG. 16 is a rear elevational view of the cavity die forming a part of the molding machine of the present invention, this view being taken in the direction of the arrows along the line 16—16 in FIG. 13.

The mechanism by which the cavity side sections 330 and the cavity sections 340 are moved from the molding position thereof to the discharging position thereof will now be described with particular reference to FIGS. 12, 13, 15, 16 and 18 of the drawings. Referring first to FIGS. 16 and 18, the rear of the cavity block 310 has a plurality of recesses therein to receive a puller bar assembly generally designated by the numeral 360 and including a top horizontal bar 361, a bottom horizontal bar 362 and a pair of vertical bars 363 and 364 extending between the horizontal bars 361 and 362 and spaced inwardly from the ends thereof and fixedly secured thereto as by welding. A pair of intermediate cross bars 365 and 366 is provided between and interconnecting the vertical bars 363 and 364 and disposed from the ends thereof and fixedly secured thereto as by welding. The bar 364 has mounted thereon a pair of actuating pins 370 (see FIG. 18) which extend outwardly therefrom and through an aligned opening in the cavity block 310 and have the outer ends thereof in position to abut against the bottom or rear surface of the associated side section 330, whereby when the bar assembly 360 is moved to the left and to the position illustrated in FIG. 18, the actuating pins 370 engage the associated side section 330 to push the side section 330 outwardly as illustrated. More specifically, the side section 330 slides outwardly upon the guides 335 and moves simultaneously outwardly or to the left and upwardly and away from the opposing side section 330 and away from a carrying case 20 heretofore molded thereby so that the undercut recess 333 is moved out of engagement with the protuberances or ribs molded on the side wall of the carrying case 20. Such movement of the side section 330 outwardly causes the rod 336 to move outwardly or to the left as viewed in FIG. 18 thus to compress the spring 339 associated therewith. When the puller bar assembly 350 is moved to the right so as to withdraw the actuating pins 370, the springs 339 acting through the rods 336 will return the side section 330 from the discharging position thereof to the molding position thereof.

It will be understood that the bar 363 carries a pair of pins 370 for moving the other side section 330 from the molding position to the discharging position thereof, the springs 339 associated therewith serving to return the side section 330 from the discharging position to the molding position thereof; the bar 365 carries a pair of actuating pins like the pin 370 for moving the upper end section 340 from the molding position thereof to the discharging position thereof, the springs 349 associated therewith returning the upper end section 340 from the discharging position to the molding position thereof; and the bar 366 carries a pair of actuating pins like the pins 370 engaging the bottom end section 340 for moving it from the molding position to the discharging position thereof, the springs 349 associated therewith returning the bottom end section from the discharging position to the molding position thereof.

Movement of the puller bar assembly 360 from the molding position to the discharging position is accomplished by and is under the control of the movement of the core die 200 and more specifically the movement of the retainer plate 205 which is fixedly mounted with respect to the movable platen 103 and moves therewith. Fixedly mounted on the outer ends of the bar 361 and on the top thereof are puller straps 371 and fixedly mounted on the lower bar 362 at the ends thereof and therebeneath are puller straps 371, the puller straps 371 being fixedly connected to the associated bar by means of screws 372 and extending outwardly therefrom toward the movable platen 103. Each of the four puller straps 371 has an elongated slot 373 therein which extends substantially the length thereof, see FIG 12 particularly, the outer end of each slot 373 being closed as at 374. The retainer plate 205 has four arms 375 disposed at the corners thereof and extending outwardly therefrom toward the stationary platen 102, the outer ends of each of the arms 375 carrying a stud 376 extending through the slot 373 in the associated puller strap 371 and having an enlarged head 377 on the outer end thereof which holds the stud 376 in the associated slot 373. The length of the puller straps 371, the length of the slots 373 therein, and the length of the arms 375 are adjusted so that the final increment of movement of the movable platen 103 to the discharging position thereof causes the studs 376 to engage the ends 374 on the straps 371, thereby to pull the frame assembly 360 from its rest position against the stationary platen 102 illustrated in FIG. 12 to the forward or discharging position illustrated in FIG. 18. Such movement of the frame 360 causes the actuating pins 370 to push the cavity side sections 330 and the cavity end sections 340 from the molding positions thereof to the discharging positions thereof illustrated in FIG. 18, whereby to move the molded carrying case 20 held therebetween away from the cavity bottom section 320 and to move the side sections 330 and the end sections 340 outwardly away from each other and away from the sides and ends of the molded carrying case 20. As soon as the movable platen 103 has moved a short distance toward the stationary platen 102, the studs 376 will move out of engagement with the strap ends 374 and permit the frame 360 to move from the discharging position to the molding position thereof against the stationary platen, the frame 360 being positively moved to the molding position thereof upon release from the control of the movable platen 103 by the action of the coiled springs 339 and 349 acting through the side section 330 and the end section 340, respectively, which in turn react upon the actuating pins 370 to drive the frame assembly 360 against the stationary platen 102.

The sprue assembly for distributing the molten plastic resin issuing from the outlet nozzle 131 of the heating cylinder 130 in FIG. 1 is generally designated by the numeral 400 and is best illustrated in FIGS 12, 13, 15, 16 and 18 of the drawings. Referring specifically to FIG. 13, the sprue assembly 400 includes a gate locator ring 401 mounted on the rear of the cavity block 310 by a pair of bolts 402 (see FIG. 16 also) and having a sprue hole 403 disposed substantially centrally thereof, the sprue hole 403 being formed in a hot runner block 410. The runner block 410 has a main entry passage 411 communicating with the sprue hole 403 and an upper distributing passage 412 and a lower distributing passage 413 which communicate respectively with longitudinally disposed injecting passages 414 and 415, respectively. Both of the injecting passages 414 and 415 communicate with the molding cavity through the cavity bottom section 320 and more specifically, communicate with outlets 416 and 417 that open into the molding cavity when the dies 200 and 300 are in the molding position, the position of the outlets 416 and 417 being indicated on FIG. 15 of the drawings. In order to insure that the plastic resin is maintained in the molding condition thereof until after it has entered the molding cavity, each of the injecting passages 414 and 415 is provided with an electrical heater therein which is mounted substantially centrally thereof by a sprue bushing assembly, the passage 414 having a sprue bushing assembly 420 carrying an electrical heater 422 therein, and the injecting passage 415 having a sprue bushing assembly 421 having an electrical heater 423 mounted therein, each of the heaters 422 and 423 being connected by suitable conductors 424 and 425 to a source of electrical power (not shown). During the molding operation, the outlet nozzle 131 of the heating cylinder 130 is placed in a proper position by engagement with the locater ring 401, and at an appropriate time in the molding cycle a predetermined charge of molten plastic resin is injected through the sprue hole 403 and into the runner block 410, and more particularly into the passage 411 thereof. The resin in the passage 411 is divided into two equal portions that flow into the vertical distributing passages 412 and 413, respectively, which in turn flow into the injecting passages 414 and 415. The heaters 422 and 423 maintain the passages 414 and 415 at proper temperature so that the resin is in the proper molding condition when injected from the passages 414 and 415 through the outlets 416 and 417, respectively, into the molding cavity defined by the dies 200 and 300. The two streams of plastic resin diffuse throughout the molding cavity completely to fill the volume thereof, thus forming the carrying case 20 upon the cooling of the resin.

The sequence of operation of the machine 100 and the interaction of the various parts thereof and particularly the molding dies 200 and 300 will now be described with particular reference to the schematic diagrams in FIGS. 6 to 11 of the drawings. To place the machine 100 in readiness for molding an article such as the carrying case 20 in FIGS. 2 to 5, the die set including the core die 200 and the cavity die 300 is assembled upon the machine 100 to provide the structure set forth above; a quantity of plastic resin is provided in the hopper 121 (see FIG. 1); and the necessary hydraulic and electrical connections are provided for the machine 100 including the electrical connections to the heaters 422 and 423 (see FIG. 13) in the sprue assembly 400. At the beginning of a molding operation, the dies 200 and 300 are in the discharging position thereof which is illustrated schematically in FIGS. 6 and 7 of the drawings. When the parts are in the discharging position, the movable platen 103 is at the extreme lefthand position thereof as viewed in FIGS. 6 to 11 and the air cylinders 220 have been operated to place the ejector plate 210 against the stops 203, i.e., in the position nearest to the clamping plate 202 and with the rods 224 in the fully extended positions thereof.

The placement of the movable platen 103 in the extreme left hand position will also place the retainer plate 205 in its extreme lefthand position, and as a consequence the bars 375 carried thereby will be fully retracted so that the studs 376 engage in the end of the puller straps 371 at the ends of the slots 373, thereby to place the puller assembly 360 in the discharging position therefor. The puller assembly 360 more particularly will hold the cavity side sections 330 and the cavity end sections 340 in the lefthand or discharging position thereof, i.e., in the position assumed at the end of the prior molding cycle and in the position wherein the carrying case 20 molded thereby has been ejected or discharged therefrom. The positioning of the ejector plate 210 by means of the air cylinders 220 against the stops 203 will place the ejector bars 240, the wedge sections 250 and the positioning pin 260 in the retracted or molding positions thereof with respect to core blocks 240.

Figure 6:
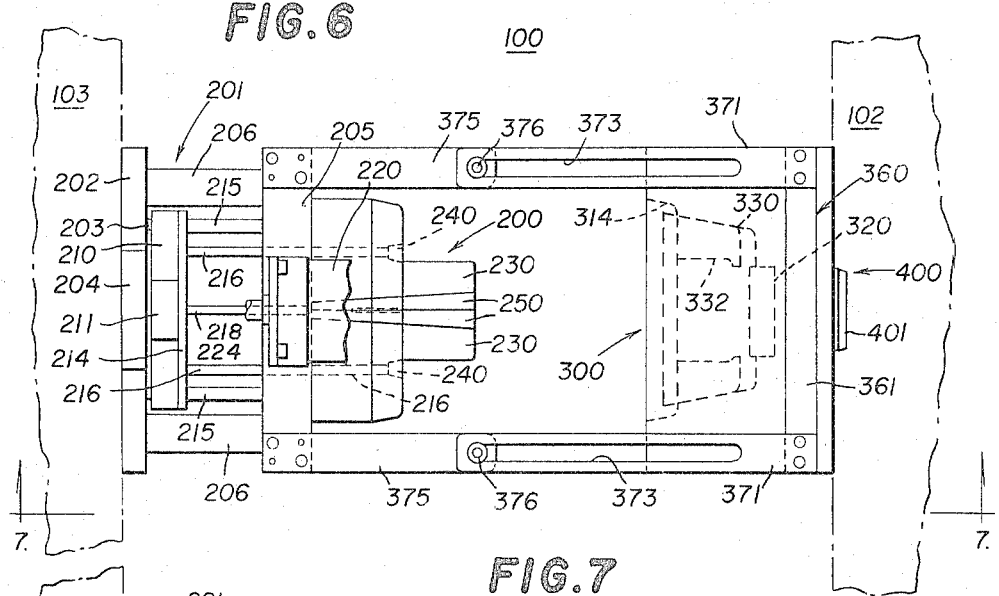
FIG. 6 is a simplified and diagrammatical plan view of the dies and mounting structure therefor forming a part of the molding machine of FIG. 1, the parts being shown in the carrying case discharging position thereof.
Figure 7:
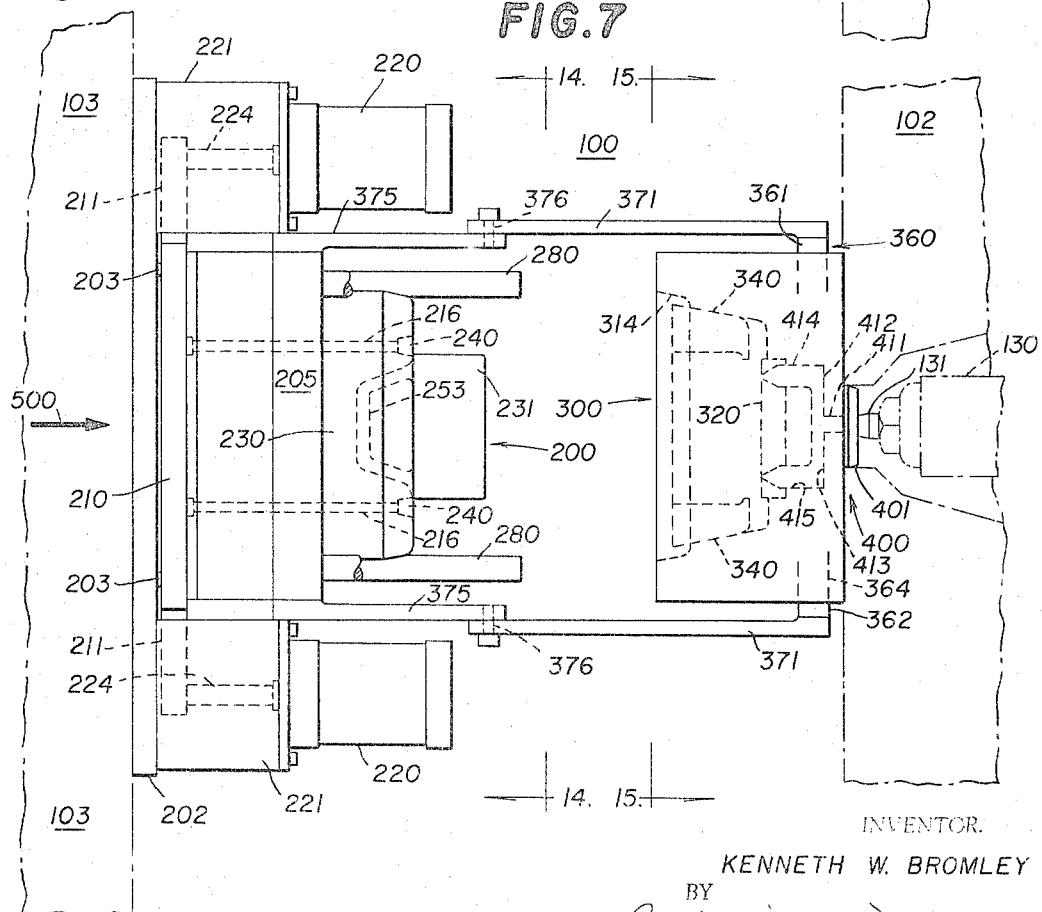
FIG. 7 is a side elevational view of the parts illustrated in FIG. 6, this view being taken in the direction of the arrows along the line 7—7 in FIG. 6.

To begin the next molding cycle, the movable platen 103 is moved by operation of the hydraulic motor 110 (see FIG. 1), in the direction of the arrow 500 in FIG. 7 and from the discharging position illustrated therein toward the molding position illustrated in FIG. 8. During the initial movement of the platen 103 from the position of FIG. 7 to that of FIG. 8, the studs 376 on the arms 375 will disengage the ends of the puller straps 371 and will move into an intermediate position within the associated slots 373. The disengagement of the studs 376 from the puller straps 371 will permit the springs 339 and 349 to move the side sections 330 and the ends sections 340, respectively, of the cavity die 300 from the outer or discharging position thereof to the inner or molding position thereof. The cavity die 300 is now in condition for the next molding operation and is ready to receive the core die 200 therein.

Continued movement of the platen 103 by continued operation of the hydraulic motor 110 will move the core die 200 to the position illustrated in FIG. 8 so as to place the core die 200 in the molding position with respect to the cavity die 300, a suitable molding cavity being formed therebetween shaped complementary to the carrying case 20 illustrated in FIGS. 2 to 5. The molding cavity more specifically is defined by the core blocks 230 including the core inserts 233, the ejector bars 240, the wedge sections 250, the positioning pin 260, the cavity bottom section 320, the cavity side sections 330 and the cavity end sections 340, all of these parts closely interfitting and being urged into tightly closed relationship with one another by the operation of the hydraulic motor 110 so that the molding cavity is essentially fluid-tight. Proper alignment of the dies 200 and 300 is in part insured by the engagement of the guide pins 280 in the associated bushings 311 and the proper distribution of pressure across the dies is insured by the provision of the spacers 207 and 219.

Prior to placing the dies 200 and 300 in the position illustrated in FIG. 8, a predetermined charge of plastic resin in pellet or powder form has been discharged from the hopper 141 past the feed control 123 and into the chamber 125, and the resin in the chamber 125 thereafter moved into the heating cylinder 130 by moving the plunger 140 a predetermined distance to the left under the control of the hydraulic motor 141 (see FIG. 1). With the dies 200 and 300 in the closed position thereof illustrated in FIG. 8, the hydraulic motor 141 is further actuated to cause the plunger 140 to move a predetermined quantity of molten resin from the heating cylinder 130 through the nozzle 131 thereof and into the sprue assembly 400, the molten resin flowing into the passage 411 (see FIG. 7) and being divided into two portions flowing into the distributing passages 412 and 413, respectively, and then into the injecting passages 414 and 415 in the direction of the arrows 501 and 502 in FIG. 8, thus into the molding cavity defined by the dies 200 and 300. The two streams of plastic resin spread throughout the molding cavity completely to fill the volume thereof, thus providing a body of resin having the form of the carrying case 20. The cooling water flowing through the dies 200 and 300 quickly congeals the resin to form a solid body shaped complementarily to the molding cavity and having the appearance of the carrying case 20 in FIGS. 2 to 5.

The hydraulic motor 110 is now actuated to begin the movement of the movable platen 102 in the direction of the arrow 504 in FIG. 9, i.e., to move the core die 200 from the molding position thereof illustrated in FIG. 8 toward the discharging position thereof. Simultaneously with the operation of the hydraulic motor 110, the air cylinders 220 are operated to move the ejector plate 210 relative to the movable platen 102 and the clamping plate 202 mounted thereon, the rate of operation of the air cylinders 220 in relation to the rate of operation of the motor 110 being such that the ejector plate 210 in effect remains in its position relative to stationary platen 103, the cavity die 300, and the molded carrying case 20. As the clamping plate 202 and the retainer plate 205 are moved to the left as viewed in FIG. 9 and away from the ejector plate 210, the core blocks 230 move relative to the wedge sections 250 and in effect cause the guide members 252 attached to the wedge sections 250 to move forwardly in the guide slots 251 in the core blocks 230 from the position illustrated in FIG. 12 to that illustrated in FIG. 17. As is best seen in FIG. 17, such movement of the wedge sections 250 and the guide blocks 252 carried thereon with respect to the core blocks 230 will cause the wedge sections 250 to move away from each other and away from the handle 50 of the carrying case just molded thereby, there being no movement of the wedge sections 250 longitudinally or to the left as viewed in FIG. 9 with respect to the newly molded handle 50. In fact the wedge sections 250 move apart a distance such that newly molded lateral projections 51a are cleared from the recesses 254 in which they are molded so that upon subsequent movement of the wedge sections 250 to the left, all portions of the newly molded handle 50 will be cleared by the wedge sections 250. As illustrated in FIG. 9, the ejector plate 210 has been moved to its full wedge section opening position relative to the clamping plate 202 and the wedge sections 250 are now in the position illustrated in FIG. 17.

Since the postioning pin 260 is also mounted upon the ejector plate 210, the positioning pin 260 will remain in contact with the newly formed handle 50 and more specifically, the slot 262 in the outer end of the pin 260 will have the handle portion 51d disposed therein, whereby the pin 260 serves to hold the newly molded handle 50 in a centered position relative to the wedge sections 250, thus insuring that both of the wedge sections 250 disengage from the adjacent side of the handle 50 to provide clearance therebetween before withdrawal of the wedge sections 250 to the left as viewed in FIGS. 9 and 17.

Furthermore, the holding of the ejector plate 210 stationary with respect to the cavity die 300 during the initial movement of the core blocks 230 from the newly molded carrying case 20 maintains the ejector bars 240 in contact with the major portion of the upper periphery of the side wall 30 of the newly formed carrying case. This contact between the ejector bars 240, and particularly the surfaces 241 thereof, and the upper edge of the wall 30 on the carrying case 20 materially facilitates the ready removal of the core blocks 230 including the core inserts 233 from the carrying case 20 and particularly the bottle receiving pockets 30A and the divider walls 43.

When the ejector plate 210 has been moved by the air cylinders 220 to the position illustrated in FIG. 9, the core blocks 230 have been completely disengaged from the carrying case 20 and the wedge sections 250 have been completely disengaged from and disposed laterally outwardly with respect to the newly formed handle 50. Accordingly, the ejector bars 240, the wedge sections 250, and the positioning pin 260 can now be withdrawn from the cavity die 300, and continued movement of the platen 102 in the direction of the arrow 504 in FIG. 9 will place the parts in the position illustrated in FIG. 10 wherein the wedge sections 250 have moved longitudinally beyond the outer end of the newly formed handle 50. At this time the air motors 220 can be actuated to move the ejector plate 210 toward the clamping plate 202, thus to move the ejector bars 240, the wedge sections 250, and the positioning pin 260 to the left relative to the core blocks 230 as viewed in FIG. 10 and into the molding position thereof, it being noted that the wedge sections 250 in addition to moving longitudinally and to the left also move laterally toward each other to reform the cavity for molding the handle 50 of the carrying case 20.

During the removal of the core die 200 from the cavity die 300, the newly molded carrying case 20 is firmly held in the caivty die 300. More particularly, the undercut recesses in the end sections 340 which mold the ribs 32a and 33a, respectively, on the sides and ends of the carrying case 20 have the aforementioned ribs 32a and 33a extending thereinto which firmly holds the carrying case 20 in the cavity die 300. Upon the movement of the platen 102 from the position illustrated in FIG. 10 to that illustrated in FIG. 11, the studs 376 carried by the arms 375 on the retainer plate 205 engage the ends 374 of the puller straps 371 defining the ends of the slots 373, thereby to cause the puller frame 360 to be moved forwardly from the position illustrated in FIG. 10 to that illustrated in FIG. 11. Such movement of the puller frame 360 causes the actuating pins 370 carried thereby to move the associated side sections 330 and end sections 340 outwardly away from the bottom section 320 and outwardly and away from each other laterally. Movement of the side sections 330 and the end sections 340 outwardly away from the bottom section 320 causes the inturned surfaces 334 and 344, respectively, to push the bottom 31 of the carrying case 20 away from and out of engagement with the bottom section 320. The lateral movement of the side sections 330 away from each other due to the relative movement thereof with respect to the guides 335 will cause the molding surfaces 333 to move out of engagement with the newly molded ribs 32a, thus to free the sides 32 of the molded carrying case 20 from the side sections 330. Similarly the lateral movement of the end sections 340 away from each other due to the relative movement thereof with respect to the guides 345 will cause the molding surfaces 343 to move out of engagement with the newly molded ribs 33a, thus to free the end walls 33 of the molded carrying case 20 from the end sections 340. Accordingly, when the parts reach the positions illustrated in FIG. 11, the carrying case 20 is completely free with respect to both the core die 200 and the cavity die 300 and can be readily removed from the cavity die 300, the carrying case 20 actually resting upon the lower one of the end sections 340.

During the movement of the puller frame 360 to the position illustrated in FIGS. 7 and 11, the springs 339 and 349 associated with the side sections 330 and the end sections 340, respectively, are compressed and will serve to return the side sections 330 and the end sections 340 to the molding positions thereof when the platen 103 is again moved to a position such that there is no force applied along the puller straps 371 from the arms 375. After the removal of the molded carrying case 20 from within the cavity die 300, the parts are again in the position illustrated in FIGS. 6 and 7 and the machine 100 is ready to mold another carrying case 20. The carrying case 20 is completely molded as one piece and the only additional work that may need be done thereon is to trim the sprues on the bottom wall 31 thereof.

Recapitulating, the machine 100 can readily mold a plastic article having both a basket-like body 30 with the ribs 32a and 33a extending laterally therefrom and substantially normal to the path of travel of the core die 200 in the moving from the molding position to the discharging position thereof, and the handle 50 having the lateral flanges 51a thereon which also extend normal to the path of travel of the core die 200 from the molding position to the discharging position thereof. The molding of the flanges 51a on the handle 50 is accomplished by retaining the carrying case 20 in the cavity die 300 during the removal of the core die 200 therefrom, and further by providing the wedge sections 250 that actually mold the handle 50 and which move laterally with respect to the direction of the travel of the core die 200 to clear the flanges 51a on the handle 50 before the wedge sections 250 are moved to the left or toward the discharging position as viewed in FIGS. 6 to 11. The desired movement of the wedge sections 250 with respect to the newly molded handle 50 is obtained by moving the core blocks 230 away from the wedge sections 250 before the movement of the wedge sections 250 from within the cavity die 300, such movement of the core blocks 230 providing space for the lateral movement of the wedge sections 250 as well as causing positive movement of the wedge sections 250 due to the action of the guides 252 in the slots 251. The relative movement between the wedge sections 250 and the core blocks 230 is achieved by a suitable operation of the air motors 220 relative to the rate of operation of the motor 110 that moves the platen 103.

In order to insure that the handle 50 disengages both of the wedge sections 250, the positioning pin 260 has been provided which positively engages the handle 50 at the point 51d during the lateral movement of the wedge sections 250 out of engagement and into a clearing position with respect to the handle 50. In addition the retention of the carrying case 20 in the cavity die 300 is insured by providing the ejector bars 240 that also aid in holding the carrying case 20 in the cavity die 300 during the withdrawal of the core blocks 230 therefrom and during the lateral outward movement of the wedge sections 250. After the wedge sections 250 have been cleared laterally with respect to the handle 50 and particularly the flanges 51a thereon, the ejector bar 240, the wedge sections 250 and the positioning pin 260 can be safely withdrawn from within the cavity die 300 without disturbing or scarring the newly formed carrying case 20. Having completely removed the core die 200 from the cavity die 300, the ejection of the carrying case 20 therefrom despite the presence of the ribs 32a and 33a is readily accomplished by the provision of the side sections 330 and the end sections 340, and specifically the mounting thereof for movement outwardly and away from the bottom section 320 and away from each other by means of the guides 335 and 345, respectively, and the cooperating slots in the side sections 330 and the end sections 340, respectively, the desired movement of the side sections 330 and the end sections 340 to the discharging position is readily accomplished by the provision of the puller frame 360 and the actuating pins 370 carried thereby, the movement of the frame 360 being under the control of the core die 200 and in response to the movement of the core die 200 to the full discharging position thereof.

From the above it will be seen that there has been provided an improved machine for molding a carrying case 20 for pop bottles and the like illustrated in FIGS. 2 to 5 and including the outwardly projecting ribs 32a and 33a on the basket-like body 30 thereof and the lateral projections 51a on the upstanding handle 50 thereon. More particularly, the core die 200 includes the core blocks 230 and a pair of wedge sections 250 movable with respect thereto and having the recesses 254 therein disposed substantially normal to the path of travel of the core die 200 from the molding position illustrated in FIG. 8 to the discharging position illustrated in FIG. 11 and cooperating in the molding position thereof to define the handle portion 51 having the lateral projections 51a thereon, the wedge sections 250 being movable laterally with respect to the path of travel of the core die 200 so that the wedge sections 250 clear the lateral projections 51a molded thereby. A pair of air cylinders 220 has been provided interconnecting the core blocks 230 and the wedge sections 250 for moving the wedge sections 250 with respect to the core blocks 230 to insure proper movement therebetween when disengaging the core die 200 from the molded carying case 20. More specifically, the ejector plate 210 has been provided carrying the wedge sections 250 and also carrying thereon the ejector bars 240 and the positioning pin 260 so that the ejector bars 240, the wedge sections 250 and the positioning pin 260 move together along the path of travel of the core die 200 between the molding and discharging positions thereof. The improved cavity die 300 forming a part of the machine 100 has the undercut areas therein forming the ribs 32a and 33a on the carrying case 20 and includes the bottom section 320 and the side sections 330 and the end sections 340, the side sections 330 and the end sections 340 being movable outwardly and away from the bottom section 320 and outwardly and away from each other to release the carrying case therefrom. The springs 339 and 349 have been provided which respectively urge the side sections 330 and the end sections 340 toward the molding position there, the side sections 330 and the end sections 340 being moved to the discharging position thereof in response to the final movement of the core die to the discharging position thereof through the actions of the puller bar frame assembly 360.

While there has been provided what is at present considered to be the preferred embodiment of the invention, it will be understood that various modifications may be made therein, and it is intended to cover in the appended claims all such modifications that fall within the true spirit and scope of the invention.

What is claimed is:

1. A machine for molding a bottle carrying case including a basket-like body having an upstanding handle thereon with lateral projections extending from both sides thereof; said machine comprising a cavity die, a core die including a core block and a pair of wedge sections movable with respect thereto, means for moving said dies along a predetermined path between a molding position and a discharging position, the dies in said molding position cooperating to proivde a molding cavity shaped complementary to the carrying case, said wedge sections having recesses therein disposed substantially normal to said predetermined path and cooperating in said molding position to define that portion of the handle having the lateral projections thereon, means for filling said molding cavity with plastic resin to form the carrying case including the handle and the lateral projections thereon extending into the associated recesses in said wedge sections, and means for moving said wedge sections laterally with respect to said predetermined path incident to the movement of said dies from said molding position toward said discharging position so that said wedge sections clear the associated lateral projections before said cavity die and said wedge sections are moved with respect to each other along said predetermined path.

2. A machine for molding a bottle carrying case including a basket-like body having an upstanding handle thereon with lateral projections extending from both sides thereof; said machine comprising a cavity die, a core die including a core block and a pair of wedge sections mounted for movement outwardly with respect to said core block and away from each other, means for moving said dies along a predetermined path between a molding position and a discharging position, the dies in said molding position cooperating to provide a molding cavity shaped complementary to the carrying case, said wedge sections having recesses therein disposed substantially normal to said predetermined path and cooperating in said molding position to define that portion of the handle having the lateral projections thereon, means for filling said molding cavity with plastic resin to form the carrying case including the handle and the lateral projections thereon extending into the associated recesses in said wedge sections, and means for moving said wedge sections simultaneously outwardly with respect to said core block and away from each other and laterally with respect to said predetermined path incident to the movement of said dies from said molding position toward said discharging position so that said wedge sections clear the associated lateral projections before said cavity die and said wedge sections are moved with respect to each other along said predetermined path.

3. A machine for molding a bottle carrying case including a basket-like body having an upstanding handle thereon with lateral projections extending from both sides thereof; said machine comprising a cavity die, a core die including a core block and a pair of wedge sections mounted for movement outwardly with respect to said core block and away from each other, means for moving said dies along a predetermined path between a molding position and a discharging position, the dies in said molding position cooperating to provide a molding cavity shaped complementary to the carrying case, said wedge sections having recesses therein disposed substantially normal to said predetermined path and cooperating in said molding position to define that portion of the handle having the lateral projections thereon, means for filling said molding cavity with plastic resin to form the carrying case including the handle and the lateral projections thereon extending into the associated recesses in said wedge sections, and motor means interconnecting said core block and said wedge sections for moving said wedge sections simultaneously outwardly with respect to said core block and away from each other and laterally with respect to said predetermined path incident to the movement of said dies from said molding position toward said discharging position so that said wedge sections clear the associated lateral projections before said cavity die and said wedge sections are moved with respect to each other along said predetermined path.

4. The machine set forth in claim 3, wherein said motor means is an hydraulic motor operable to move said core block away from said wedge sections along said predetermined path at the same rate that said die moving means moves said dies from said molding position toward said discharging position.

5. A machine for molding a bottle carrying case including a basket-like body having an upstanding handle thereon with lateral projections extending from both sides thereof; said machine comprising a cavity die, a core die including a core block and a pair of wedge sections mounted for movement outwardly with respect to said core block and away from each other, means for moving said dies along a predetermined path between a molding position and a discharging position, the dies in said molding position cooperating to provide a molding cavity shaped complementary to the carrying case, said wedge sections having recesses therein disposed substantially normal to said predetermined path and cooperating in said molding position to define that portion of the handle having the lateral projections thereon, means for filling said molding cavity with plastic resin to form the carrying case including the handle and the lateral projections thereon extending into the associated recesses in said wedge sections, an ejector member engaging the molded carrying case for separating said core die from the molded carrying case incident to the movement of said dies from said molding position toward said discharging position, and means for moving said wedge sections simultaneously outwardly with respect to said core block and away from each other and laterally with respect to said predetermined path incident to the movement of said dies from said molding position toward said discharging position while said ejector member engages the molded carrying case so that said wedge sections clear the associated lateral projections before said cavity die and said wedge sections are moved with respect to each other along said predetermined path.

6. A machine for molding a bottle carrying case including a basket-like body having an upstanding handle thereon with lateral projections extending from both sides thereof; said machine comprising a cavity die, a core die including a core block and a pair of wedge sections mounted for movement outwardly with respect to said core block and away from each other, means for moving said dies along a predetermined path between a molding position and a discharging position, the dies in said molding position cooperating to provide a molding cavity shaped complementary to the carrying case, said wedge sections having recesses therein disposed substantially normal to said predetermined path and cooperating in said molding position to define that portion of the handle having the lateral projections thereon, means for filling said molding cavity with plastic resin to form the carrying case including the handle and the lateral projections thereon extending into the associated recesses in said wedge sections, means for moving said wedge sections simultaneously outwardly with respect to said core block and away from each other and laterally with respect to said predetermined path incident to the movement of said dies from said molding position toward said discharging position, and a positioning member engaging the molded handle during the movement of said wedge sections outwardly with respect to said core block for insuring disengagement of said wedge sections from the molded handle and the lateral projections thereon before said cavity die and said wedge sections are moved with respect to each other along said predetermined path.

7. A machine for molding a bottle carrying case including a basket-like body having an upstanding handle thereon with lateral projections extending from both sides thereof; said machine comprising a cavity die, a core die including a core block and a pair of wedge sections mounted for movement outwardly with respect to said core block and away from each other, means for moving said dies along a predetermined path between a molding position and a discharging position, the dies in said molding position cooperating to provide a molding cavity shaped complementary to the carrying case, said wedge sections having recesses therein disposed substantially normal to said predetermined path and cooperating in said molding position to define that portion of the handle having the lateral projections thereon, means for filling said molding cavity with plastic resin to form the carrying case including the handle and the lateral projections thereon extending into the associated recesses in said wedge sections, an ejector member engaging the molded carrying case for separating said core die from the molded carrying case incident to the movement of said dies from said molding position toward said discharge position, means for moving said wedge sections simultaneously outwardly with respect to said core block and away from each other and laterally with respect to said predetermined path incident to the movement of said dies from said molding position toward said discharging position while said ejector member engages the molded carrying case, and a positioning member engaging the molded handle during the movement of said wedge sections outwardly with respect to said core block for insuring disengagement of said wedge sections from the molded handle and the lateral projections thereon before said cavity die and said wedge sections are moved with respect to each other along said predetermined path.

8. A machine for molding a bottle carrying case including a basket-like body having an upstanding handle thereon with lateral projections extending from both sides thereof; said machine comprising a cavity die, a core die including a core block and a pair of wedge sections mounted for movement outwardly with respect to said core block and away from each other, means for moving said dies along a predetermined path between a molding position and a discharging position, the dies in said molding position cooperating to provide a molding cavity shaped complementary to the carrying case, said wedge sections having recesses therein disposed substantially normal to said predetermined path and cooperating in said molding position to define that portion of the handle having the lateral projections thereon, means for filling said molding cavity with plastic resin to form the carrying case including the handle and the lateral projections thereon extending into the associated recesses in said wedge sections, a first ejector member engaging the molded carrying case for separating said core die from the molded carrying case incident to the movement of said dies from said molding position toward said discharging position, means for moving said wedge sections simultaneously outwardly with respect to said core block and away from each other and laterally with respect to said predetermined path incident to the movement of said dies from said molding position toward said discharging position while said first ejector member engages the molded carrying case so that said wedge sections clear the associated lateral projections before said cavity dies and said wedge sections are moved with respect to each other along said predetermined path, and a second ejector member for ejecting the molded carrying case from said cavity die after said wedge sections are moved along said predetermined path beyond the molded handle.

9. A machine for molding a bottle carrying case including a basket-like body having an upstanding handle thereon with lateral projections extending from both sides thereof; said machine comprising a cavity die, a core die including a core block and a pair of wedge sections mounted for movement outwardly with respect to said core block and away from each other, means for moving said dies along a predetermined path between a molding position and a discharging position, the dies in said molding position cooperating to provide a molding cavity shaped complementary to the carrying case, said wedge sections having recesses therein disposed substantially normal to said predetermined path and cooperating in said molding position to define that portion of the handle having the lateral projections thereon, means for filling said molding cavity with plastic resin to form the carrying case including the handle and the lateral projections thereon extending into the associated recesses in said wedge sections, a first ejector member engaging the molded carrying case for separating said core die from the molded carrying case incident to the movement of said dies from said molding position toward said discharging position, means for moving said wedge sections simultaneously outwardly with respect to said core block and away from each other and laterally with respect to said predetermined path incident to the movement of said dies from said molding position toward said discharging position while said first ejector member engages the molded carrying case, a positioning member engaging the molded handle during the movement of said wedge sections outwardly with respect to said core block for insuring disengagement of said wedge sections from the molded handle and the lateral projections thereon before said cavity die and said wedge sections are moved with respect to each other along said predetermined path, and a second ejector member for ejecting the molded carrying case from said cavity die after said wedge sections are moved along said predetermined path beyond the molded handle.

10. A machine for molding a bottle carrying case including a basket-like body having an upstanding handle thereon with lateral projections extending from both sides thereof; said machine comprising a cavity die, a core die including a core block and a pair of wedge sections mounted for movement outwardly with respect to said core block and away from each other, means for moving said dies along a predetermined path between a molding position and a discharging position, the dies in said molding position cooperating to provide a molding cavity shaped complementary to the carrying case, said wedge sections having recesses therein disposed substantially normal to said predetermined path and cooperating in said molding position to define that portion of the handle having the lateral projections thereon, means for filling said molding cavity with plastic resin to form the carrying case including the handle and the lateral projections thereon extending into the associated recesses in said wedge sections, an ejector plate mounted for movement toward and away from said core block along said predetermined path, said wedge sections being connected to said ejector plate for movement therewith along said predetermined path and laterally with respect thereto, and motor means interconnecting said core block and said ejector plate for moving said ejector plate toward said core block incident to the movement of said dies from said molding position toward said discharging position to move said wedge sections simultaneously outwardly and laterally with respect to said core block and with respect to said predetermined path so that said wedge sections clear the associated lateral projections before said cavity die and said wedge sections are moved with respect to each other along said predetermined path.

11. A machine for molding a bottle carrying case including a basket-like body having an upstanding handle thereon with lateral projections extending from both sides thereof; said machine comprising a cavity die, a core die including a core block and a pair of wedge sections mounted for movement outwardly with respect to said core block and away from each other, means for moving said dies along a predetermined path between a molding position and a discharging position, the dies in said molding position cooperating to provide a molding cavity shaped complementary to the carrying case, said wedge sections having recesses therein disposed substantially normal to said predetermined path and cooperating in said molding position to define that portion of the handle having the lateral projections thereon, means for filling said molding cavity with plastic resin to form the carrying case including the handle and the lateral projections thereon extending into the associated recesses in said wedge sections, an ejector plate mounted for movement toward and away from said core block along said predetermined path, said wedge sections being connected to said ejector plate for movement therewith along said predetermined path and laterally with respect thereto, an ejector member mounted on said ejector plate for movement therewith and engaging the molded carrying case for separating said core die from the molded carrying case incident to the movement of said dies from said molding position toward said discharging position, and motor means interconnecting said core block and said ejector plate for moving said ejector plate toward said core block incident to the movement of said dies from said molding position toward said discharging position to move said wedge sections simultaneously outwardly and laterally with respect to said core block and with respect to said predetermined path while said ejector member engages the molded carrying case so that said wedge sections disengage the molded handle and clear the associated lateral projections before said cavity die and said wedge sections are moved with respect to each other along said predetermined path.

12. A machine for molding a bottle carrying case including a basket-like body having an upstanding handle thereon with lateral projections extending from both sides thereof; said machine comprising a cavity die, a core die including a core block and a pair of wedge sections mounted for movement outwardly with respect to said core block and away from each other, means for moving said dies along a predetermined path between a molding position and a discharging position, the dies in said molding position cooperating to provide a molding cavity shaped complementary to the carrying case, said wedge sections having recesses therein disposed substantially normal to said predetermined path and cooperating in said molding position to define that portion of the handle having the lateral projections thereon, means for filling said molding cavity with plastic resin to form the carrying case including the handle and the lateral projections thereon extending into the associated recesses in said wedge sections, an ejector plate mounted for movement toward and away from said core block along said predetermined path, said wedge sections being connected to said ejector plate for movement therewith along said predetermined path and laterally with respect thereto, a positioning member mounted on said ejector plate for engaging the molded handle, and motor means interconnecting said core block and said ejector plate for moving said ejector plate toward said core block incident to the movement of said dies from said molding position to said discharging position to move said wedge sections simultaneously outwardly and laterally with respect to said core block and with respect to said predetermined path while said positioning member engages the molded handle so that said wedge sections disengage the molded handle and clear the associated lateral projections thereon before said cavity die and said wedge sections are moved with respect to each other along said predetermined path.

13. A machine for molding a bottle carrying case including a basket-like body having an upstanding handle thereon with lateral projections extending from both sides thereof; said machine comprising a cavity die, a core die including a core block and a pair of wedge sections mounted for movement outwardly with respect to said core block and away from each other, means for moving said dies along a predetermined path between a molding position and a discharging position, the dies in said molding position cooperating to provide a molding cavity shaped complementary to the carrying case, said wedge sections having recesses therein disposed substantially normal to said predetermined path and cooperating in said molding position to define that portion of the handle having the lateral projections thereon, means for filling said molding cavity with plastic resin to form the carrying case including the handle and the later projections thereon extending into the associated recesses in said wedge sections, an ejector plate mounted for movement toward and away from said core block along said predetermined path, said wedge sections being connected to said ejector plate for movement therewith along said predetermined path and laterally with respect thereto, ejector member mounted on said ejector plate for movement therewith and engaging the molded carrying case for separating said core die from the molded carrying case incident to the movement of said dies from said molding position toward said discharging position, a positioning member mounted on said ejector plate for engaging the molded handle, and motor means interconnecting said core block and said ejector plate for moving said ejector plate toward said core block incident to the movement of said dies from molding position to said discharging position to move said wedge sections simultaneously outwardly and laterally with respect to said core block and with respect to said predetermined path while said ejector member engages the molded carrying case and while said positioning member engages the molded handle so that said wedge sections disengage the molded handle and clear the associated lateral projections thereon before said cavity die and said wedge sections are moved with respect to each other along said predetermined path.

14. A machine for molding a bottle carrying case including a basket-like body having an upstanding handle thereon with lateral projections extending from both sides thereof; said machine comprising a cavity die, a core die including a core block and a pair of wedge sections mounted for movement outwardly with respect to said core block and away from each other, means for moving said dies along a predetermined path between a molding position and a discharging position, the dies in said molding position cooperating to provide a molding cavity shaped complementary to the carrying case, said wedge sections having recesses therein disposed substantially normal to said predetermined path and cooperating in said molding position to define that portion of the handle having the lateral projections thereon, means for filling said molding cavity with plastic resin to form the carrying case including the handle and the lateral projections thereon extending into the associated recesses in said wedge sections, an ejector plate mounted for movement toward and away from said core block along said predetermined path, said wedge sections being connected to said ejector plate for movement therewith along said predetermined path and laterally with respect thereto, a first ejector member mounted on said ejector plate for movement therewith and engaging the molded carrying case for separating said core die from the molded carrying case incident to the movement of said dies from said molding position toward said discharging position, motor means interconnecting said core block and said second ejector plate for moving said second ejector plate toward said core block incident to the movement of said dies from said molding position toward said discharging position to move said wedge sections simultaneously outwardly and laterally with respect to said core block and with respect to said predetermined path while said ejector member engages the molded carrying case so that said wedge sections disengage the molded handle and clear the associated lateral projections before said cavity die and said wedge sections are moved with respect to each other along said predetermined path and a second ejector member operative after the movement of said ejector plate to a position such that said wedge sections are disposed beyond the molded handle for ejecting the molded carrying case from said cavity die.

15. A machine for molding a bottle carrying case including a basket-like body having an upstanding handle thereon with lateral projections extending from both sides thereof; said machine comprising a cavity die, a core die including a core block and a pair of wedge sections mounted for movement outwardly with respect to said core block and away from each other, means for moving said dies along a predetermined path between a molding position and a discharging position, the dies in said molding position cooperating to provide a molding cavity shaped complementary to the carrying case, said wedge sections saving recesses therein disposed substantially normal to said predetermined path and cooperating in said molding position to define that portion of the handle having the lateral projections thereon, means for filling said molding cavity with plastic resin to form the carrying case including the handle and the lateral projections thereon extending into the associated recesses in said wedge sections, an ejector plate mounted for movement toward and away from said core block along said predetermined path, said wedge sections being connected to said ejector plate for movement therewith along said predetermined path and laterally with respect thereto, a first ejector member mounted on said ejector plate for movement therewith and engaging the molded carrying case for separating said core die from the molded carrying case incident to the movement of said dies from said molding position toward said discharging position, a positioning member mounted on said ejector plate for engaging the molded handle, and motor means interconnecting said core block and said ejector plate toward said core block incident to the movement of said dies from said molding position toward said discharging position to move said wedge sections simultaneously outwardly and laterally with respect to said core block and with respect to said predetermined path while said first ejector member engages the molding carrying case and while said positioning member engages the molded handle so that said wedge sections are disengaged from the molded handle and clear the associated lateral projections before said cavity die and said wedge sections are moved with respect to each other along said predetermined path, and a second ejector member operative after the movement of said ejector plate to a position such that said wedge sections are disposed beyond the molded handle for ejecting the molded carrying case from said cavity die.

16. A machine for molding a bottle carrying case including a basket-like body having lateral protuberances thereon; said machine comprising a core die, a cavity die including a bottom section and a pair of side sections mounted for movement outwardly with respect to said bottom section and away from each other, means for moving said dies along a predetermined path between a molding position and a discharging position, the dies in said molding position cooperating to provide a molding cavity shaped complementary to the carrying case, said side sections having undercut recesses therein disposed substantially normal to said predetermined path and cooperating in said molding position to define that portion of the body having the lateral protuberances thereon, means for filling said molding cavity with plastic resin to form the carrying case including the body and the lateral protuberances thereon extending into the associated recesses in said side sections, and means for moving said side sections laterally with respect to said predetermined path incident to the movement of said dies from said molding position toward said discharging position so that said side sections clear the associated lateral protuberance before the molded carrying case is removed from said cavity die along said predetermined path.

17. A machine for molding a bottle carrying case including a basket-like body having lateral protuberances thereon; said machine comprising a core die, a cavity including a bottom section and a pair of side sections mounted for movement outwardly with respect to said bottom section and away from each other, means resiliently urging said side sections toward said bottom sectoin to form said cavity die, means for moving said dies along a predetermined path between a molding position and a discharging position, the dies in said molding position cooperating to provide a molding cavity shaped complementary to the carrying case, said side sections having undercut recesses therein disposed substantially normal to said predetermined path and cooperating in said molding position to define that portion of the body having the lateral protuberances thereon, means for filling said molding cavity with plastic resin to form the carrying case including the body and the lateral protuberances thereon extending into the associated recesses in said side sections, and means responsive to the movement of said core section out of the molded carrying case incident to the movement of said dies from said molding position toward said discharging position for moving said side sections against the action of said resilient means laterally with respect to said predetermined path so that said side sections clear the associated lateral protuberances before the molded carrying case is removed from said cavity die along said predetermined path.

18. A machine for molding a bottle carrying case including a basket-like body having lateral proturberances thereon and having an upstanding handle with lateral projections extending from both sides thereof; said machine comprising a cavity die including a bottom section and a pair of side sections mounted for movement outwardly with respect to said bottom section and away from each other, a core die including a core block and a pair of wedge sections mounted for movement outwardly with respect to said core block and away from each other, means for moving said dies along a predetermined path between a molding position and a discharging position, the dies in said molding position cooperating to provide a molding cavity shaped complementary to the carrying case, said side section having undercut recesses therein disposed substantially normal to said predetermined path and cooeprating in said molding position to define that portion of the body having the lateral protuberances thereon, said wedge sections having recesses therein disposed substantially normal to said predetermined path and cooperating in said molding position to define that portion of the handle having the lateral projections thereon, means for filling said molding cavity with plastic resin to form the carrying case including the body and the lateral protuberances thereon extending into the associated recesses in said side sections and the handle with the lateral projections thereon extending into the associated recesses in said wedge sections, means for moving said wedge sections laterally with respect to said predetermined path incident to the movement of said dies from said molding position toward said discharging position so that said wedge sections clear the associated lateral projections before said cavity die and said wedge sections are moved with respect to each other along said predetermined path, and means for moving said side sections laterally with respect to said predetermined path incident to the movement of said dies from said molding position toward said discharging position so that said side sections clear the associated lateral protuberances to free the molded carying case from said cavity die.

19. A machine for molding a bottle carrying case including a basket-like body having lateral protuberances thereon and having an upstanding handle with lateral projections extending from both sides thereof; said machine comprising a cavity die including a bottom section and a pair of side sections mounted for movement outwardly with respect to said bottom section and away from each other, a core die including a core block and a pair of wedge sections mounted for movement outwardly with respect to said core block and away from each other, means for moving said dies along a predetermined path between a molding position and a discharging position, the dies in said molding position cooperating to provide a molding cavity shaped complementary to the carrying case, said side sections having undercut recesses therein disposed substantially normal to said predetermined path and cooperating in said molding position to define that portion of the body having the lateral protuberances thereon, said wedge sections having recesses therein disposed substantially normal to said predetermined path and cooperating in said molding position to define that portion of the handle having the lateral projections thereon, means for filling said molding cavity with plastic resin to form the carrying case including the body and the lateral protuberances thereon extending into the associated recesses in said side sections and the handle with the lateral projections thereon extending into the associated recesses in said wedge sections, an ejector member engaging the molded carrying case for separating said core die from the molded carrying case incident to the movement of said dies from said molding position toward said discharging position, means for moving said wedge sections simultaneously outwardly with respect to said core block and laterally with respect to said predetermined path incident to the movement of said dies from said molding position toward said discharging position while said ejector engages the molded carrying case so that said wedge sections clear the associated lateral projections before said cavity die and said wedge sections are moved with respect to each other along said predetermined path, and means for moving said side sections outwardly from said bottom section and laterally with respect to said predetermined path incident to the movement of said dies from said molding position toward said discharging position so that said side sections clear the associated lateral protuberances and to eject the molded carrying case from said bottom section.

20. A machine for molding a bottle carrying case including a basket-like body having lateral protuberances thereon and having an upstanding handle with lateral projections extending from both sides thereof; said machine comprising a cavity die including a bottom section and a pair of side sections mounted for movement outwardly with respect to said bottom section and away from each other, a core die including a core block and a pair of wedge sections mounted for movement outwardly with respect to said core block and away from each other, means for moving said dies along a predetermined path between a molding position and a discharging position, the dies in said molding position cooperating to provide a molding cavity shaped complementary to the carrying case, said side sections having undercut recesses therein disposed substantially normal to said predetermined path and cooperating in said molding position to define that portion of the body having the lateral protuberances thereon, said wedge sections having recesses therein disposed substantially normal to said predetermined path and cooperating in said molding position to define that portion of the handle having the lateral projections thereon, means for filling said molding cavity with plastic resin to form the carrying case including the body and the lateral protuberances thereon extending into the associated recesses in said side sections and the handle with the lateral projections thereon extending into the associated recesses in said wedge sections, an ejector member engaging the molded carrying case for separating said core die from the molded carrying case incident to the movement of said dies from said molding position toward said discharging position, a positioning member for engaging the molded handle during the movement of said wedge sections outwardly with respect to said core block, means for moving said wedge sections outwardly with respect to said core block and laterally with respect to said predetermined path incident to the movement of said dies from said molding position toward said discharging position while said ejector member engages the molded carrying case and while said positioning member engages the molded handle so that said wedge sections disengage and clear the associated lateral projections before said cavity die and said wedge sections are moved with respect to each other along said predetermined path, and means for moving said side sections outwardly from said bottom section and laterally with respect to said predetermined path incident to the movement of said dies from said molding position toward said discharging position so that said side sections clear the associated lateral protuberances and to eject the molded carrying case from said bottom section.

21. A machine for molding a bottle carrying case including a basket-like body having lateral protuberances thereon and having an upstanding handle with lateral projections extending from both sides thereof; said machine comprising a cavity die including a bottom section and a pair of side sections mounted for movement outwardly with respect to said bottom section and away from each other, a core die including a core block and a pair of wedge sections mounted for movement outwardly with respect to said core block and away from each other, means for moving said dies along a predetermined path between a molding position and a discharging position, the dies in said molding position cooperating to provide a molding cavity shaped complementary to the carrying case, said side sections having undercut recesses therein disposed substantially normal to said predetermined path and cooperating in said molding position to define that portion of the body having the lateral protuberances thereon, said wedge sections having recesses therein disposed substantially normal to said predetermined path and cooperating in said molding position to define that portion of the handle having the lateral projections thereon, means for filling said molding cavity with plastic resin to form the carrying case including the body and the lateral protuberances thereon extending into the associated recesses in said side sections and the handle with the lateral projections thereon extending into the associated recesses in said wedge sections, an ejector plate mounted for movement toward and away from said core block along said predetermined path, said wedge sections being connected to said ejector plate for movement therewith along said predetermined path and laterally with respect thereto, motor means interconnecting said core block and said ejector plate for moving said ejector plate toward said core block incident to the movement of said dies from said molding position toward said discharging position to move said wedge sections simultaneously outwardly and laterally with respect to said core block and with respect to said predetermined path so that said wedge sections clear the associated lateral projections before said cavity die and said wedge sections are moved with respect to each other along said predetermined path, and means responsive to the movement of said core die substantially to said discharging position for moving said side sections laterally with respect to said predetermined path so that said side sections clear the associated lateral protuberances to free the molded carrying case from said cavity die.

22. A machine for molding a bottle carrying case including a basket-like body having lateral protuberances thereon and having an upstanding handle with lateral projections extending from both sides thereof; said machine comprising a cavity die including a bottom section and a pair of side sections mounted for movement outwardly with respect to said bottom section and away from each other, a core die including a core block and a pair of wedge sections mounted for movement outwardly with respect to said core block and away from each other, means for moving said dies along a predetermined path between a molding position and a discharging position, the dies in said molding position cooperating to provide a molding cavity shaped complementary to the carrying case, said side sections having undercut recesses therein disposed substantially normal to said predetermined path and cooperating in said molding position to define that portion of the body having the lateral protuberances thereon, said wedge sections having recesses therein disposed substantially normal to said predetermined path and cooperating in said molding position to define that portion of the handle having the lateral projections thereon, means for filling said molding cavity with plastic resin to form the carrying case including the body and the lateral protuberances thereon extending into the associated receses in said side sections and the handle with the lateral projections thereon extending into the associated recesses in said wedge sections, an ejector plate mounted for movement toward and away from said core block along said predetermined path, said wedge sections being connected to said ejector plate for movement therewith along said predetermined path and laterally with respect thereto, an ejector member mounted on said ejector plate for movement therewith and engaging the molded carrying case when said dies are in the molding position thereof, motor means interconnecting said core block and said ejector plate for moving said ejector plate toward said core block incident to the movement of said dies for said molding position toward said discharging position to move said wedge sections simultaneously outwardly and laterally with respect to said core block and with respect to said predetermined path while said ejector member engages the molded carrying case so that said wedge sections disengage and clear the associated lateral projections before said cavity die and said wedge sections are moved with respect to each other along said predetermined path, and means responsive to the movement of said core die substantially to said discharging position for moving said side sections laterally with respect to said predetermined path so that said side sections clear the associated lateral protuberances to free the molded carrying case from said cavity die.

23. A machine for molding a bottle carrying case including a basket-like body having lateral proturberances thereon and having an upstanding handle with lateral projections extending from both sides thereof; said machine comprising a cavity die including a bottom section and a pair of side sections mounted for movement outwardly with respect to said bottom section and away from each other, a core die including a core block and a pair of wedge sections mounted for movement outwardly with respect to said core block and away from each other, means for moving said dies along a predetermined path between a molding position and a discharging position, the dies in said molding position cooperating to provide a molding cavity shaped complementary to the carrying case, said side sections having undercut recesses therein disposed substantially normal to said predetermined path and cooperating in said molding position to define that portion of the body having the lateral proturberances thereon, said wedge sections having recesses therein disposed substantially normal to said predetermined path and cooperating in said molding position to define that portion of the handle having the lateral projections thereon, means for filling said molding cavity with plastic resin to form the carrying case including the body and the lateral protuberances thereon extending into the associated recesses in said side sections and the handle with the lateral projections thereon extending into the associated recesses in said wedge sections, an ejector plate mounted for movement toward and away from said core block along said predetermined path, said wedge sections being connected to said ejector plate for movement therewith along said predetermined path and laterally with respect thereto, an ejector member mounted on said ejector plate for movement therewith and engaging the molded carrying case when said dies are in the molding position thereof, a positioning member mounted on said ejector plate for movement therewith and engaging the molded handle when said dies are in the molding position thereof, motor means interconnecting said core block and said ejector plate for moving said ejector plate toward said core block incident to the movement of said dies from said molding position toward said disengaging position to move said wedge sections simultaneously outwardly and laterally with respect to said core block and with respect to said predetermined path while said ejector member holds the molded carrying case in said cavity die and while said positioning member engages the molded handle so that said wedge sections disengage and clear the associated lateral projections before said cavity die and said wedge sections are moved with respect to each other along said predetermined path, and means for moving said side sections outwardly from said bottom section and laterally with respect to said predetermined path incident to the movement of said dies from said molding position toward said discharging position so that said side sections clear the associated lateral protuberances and to eject the molded carrying case from said bottom section.

References Cited by the Examiner

UNITED STATES PATENTS

| | | | |
|---|---|---|---|
| 2,896,251 | 7/1959 | Sherman | 264—328 |
| 3,020,594 | 2/1962 | Makowski | 264—318 |
| 3,045,862 | 7/1962 | Chelbor | 220—102 |

FOREIGN PATENTS 311,149  1/1954  Switzerland.

ROBERT F. WHITE, *Primary Examiner.*

R. B. MOFFITT, *Assistant Examiner.*